(12) United States Patent
Suzuki et al.

(10) Patent No.: US 8,642,165 B2
(45) Date of Patent: Feb. 4, 2014

(54) ORGANIC-INORGANIC HYBRID COMPOSITION

(75) Inventors: Ryo Suzuki, Kanagawa (JP); Hiroaki Mochizuki, Kanagawa (JP); Tatsuhiko Obayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1004 days.

(21) Appl. No.: 12/527,267

(22) PCT Filed: Mar. 27, 2008

(86) PCT No.: PCT/JP2008/056653
§ 371 (c)(1),
(2), (4) Date: Aug. 14, 2009

(87) PCT Pub. No.: WO2008/120811
PCT Pub. Date: Oct. 9, 2008

(65) Prior Publication Data
US 2010/0104842 A1    Apr. 29, 2010

(30) Foreign Application Priority Data

Mar. 29, 2007 (JP) ................................. 2007-086644
Mar. 29, 2007 (JP) ................................. 2007-086645
Mar. 29, 2007 (JP) ................................. 2007-086646

(51) Int. Cl.
| B32B 5/16  | (2006.01) |
| B32B 27/32 | (2006.01) |
| C08G 75/04 | (2006.01) |
| C08K 3/22  | (2006.01) |
| G02B 1/02  | (2006.01) |

(52) U.S. Cl.
USPC ........... 428/220; 428/328; 528/376; 524/434; 524/430

(58) Field of Classification Search
None
See application file for complete search history.

(56) References Cited

U.S. PATENT DOCUMENTS

| 5,902,569 | A   |   | 5/1999  | Oshima et al.            |
| 6,201,099 | B1  | * | 3/2001  | Petersen et al. ... 528/376 |
| 6,329,058 | B1  | * | 12/2001 | Arney et al. ... 428/403 |
| 7,649,035 | B2  |   | 1/2010  | Taima                    |
| 2006/0128869 | A1 |   | 6/2006  | Taima                    |
| 2008/0200582 | A1 |   | 8/2008  | Craciun et al.           |
| 2009/0267033 | A1 |   | 10/2009 | Zhang                    |

FOREIGN PATENT DOCUMENTS

| CA | 1221186 A    | 4/1987  |
| CN | 1183038 A    | 5/1998  |
| DE | 10254808 A1  | 6/2004  |
| EP | 0102145 A    | 3/1984  |
| EP | 0421193 A1   | 4/1991  |
| GB | 2091355 A    | 7/1982  |
| JP | 61-261321 A  | 11/1986 |
| JP | 2002-114917 A | 4/2002  |
| JP | 2002-241509 A | 8/2002  |
| JP | 2003-206363 A | 7/2003  |
| JP | 2003-266534 A | 9/2003  |
| JP | 2005-126575 A | 5/2005  |
| JP | 2006-161000 A | 6/2006  |
| JP | 2008-056826 A | 3/2008  |
| JP | 2008-214410 A | 9/2008  |
| WO | 2008-101806 A2 | 8/2008 |

OTHER PUBLICATIONS

Wypych, G. "Handbook of Fillers". ChemTec Publishing, (2000); pp. 15-177.*
Chinese Office Action dated May 20, 2011 on Chinese Patent Application No. 200880010684.6.
International Preliminary Report on Patentability dated Oct. 8, 2009 in International Application No. PCT/JP2008/056653.
Office Action dated Dec. 2, 2010 on European Patent Application No. 08 739 760.
Office Action dated Oct. 30, 2012 in Japanese Application No. 2007-086644.
Office Action dated Oct. 16, 2012 in Japanese Application No. 2007-086645.

* cited by examiner

Primary Examiner — Prashant J Khatri
(74) Attorney, Agent, or Firm — Sughrue Mion, PLLC

(57) ABSTRACT

An organic-inorganic hybrid composition comprising a thermoplastic resin and inorganic fine particles, wherein the thermoplastic resin is a resin comprising a repeat unit in which a structure unit represented by the following formula (1) is contained in the main chain of the repeat unit:

Formula (1)

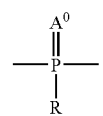

wherein R represents an alkyl group, an aryl group, an alkoxy group, an aryloxy group or hydroxyl group; and $A^0$ represents oxygen atom, sulfur atom or selenium atom.

15 Claims, No Drawings

ORGANIC-INORGANIC HYBRID COMPOSITION

TECHNICAL FIELD

The present invention relates to an organic-inorganic hybrid composition with excellent high refraction properties, great transparency, lightweight properties and good processability, as well as optical parts such as lens materials in constitutions comprising the same (for example, eyeglass lens, lenses for optical appliances, lenses for opto-electronics, lenses for laser, pick-up lenses, lenses for in-vehicle camera, lenses for portable camera, lenses for digital camera, and lenses for OHP).

BACKGROUND ART

Active research works have been made recently on optical materials. In the field of lens materials, in particular, the development of materials with good refraction properties, transparency, ready moldability, lightweight properties, chemical resistance and solvent resistance has been desired strongly.

Compared with inorganic materials such as glass, plastic lens is of such a lightweight that it hardly cracks, so such lens can be processed in various shapes. Therefore, plastic lens is rapidly spreading into not only eyeglass lens but also optical materials such as lenses for portable camera and pick-up lenses.

Following the spread, it is needed now to prepare materials per se with large refractive indices for the purpose of preparing thin lenses and preparing imaging devices in small shapes. For example, the technique for introducing sulfur atom into polymers (see for example JP-A-2002-131502 and JP-A-10-298287) and the technique for introducing halogen atoms and aromatic rings into polymers (see for example JP-A-2004-244444) have been researched actively. However, not any plastic material with a large refractive index and good transparency, which can be a glass alternative, has been developed yet. For optical fibers and optical waveguides, additionally, materials with different refractive indices are used in combination or a material with a distribution of the refractive index is used. So as to provide a material with variable refractive indices in various regions therein, the development of a technique for appropriately adjusting the refractive index has also been desired.

Since it is hard to raise the refractive index using organic matters alone, a report is issued about the method for allowing a resin to have a larger refractive index by dispersing an inorganic matter with a large refractive index in the resin matrix (see for example JP-A-2003-73559). So as to reduce the reduction of transmitted light via Rayleigh scattering, preferably, inorganic fine particles of a particle size of 15 nm or less are dispersed uniformly in the resin matrix. Because such primary fine particles of a particle size of 15 nm or less aggregate very readily, however, it is very hard to uniformly disperse such particles in the resin matrix. Taking account of the reduction of transmitted light in the optical path corresponding to the lens thickness, the amount of added inorganic fine particles should inevitably be limited. Therefore, it has never been achieved to disperse fine particles at a high concentration in a resin matrix without any reduction of the transparency of the resin.

Reports have also been issued, telling about a molded article mainly comprising a thermoplastic resin composition where ultra-fine particles of a number average particle size of 0.5 to 50 nm are dispersed, which is a molded article of a resin composition where the mean of the birefrigence of per 1 mm·optical wavelength is 10 nm or less (see for example JP-A-2003-147090), a thermoplastic material composition comprising an inorganic fine particle with a specific mean particle diameter and a specific refractive index, and optical parts using the same (see for example JP-A-2003-73563 and JP-A-2003-73564). These are also prepared by dispersing inorganic fine particles in resins. In terms of allowing fine particles to be dispersed at high concentrations in resin matrices without any reduction of the resin transparency, not any of the resulting products can exert sufficient performances.

Alternatively, for example, a method for melting and kneading together inorganic fine particles with the surface modified organically and acidic group-containing resins is reported as an organic-inorganic hybrid composition. The amount of added inorganic fine particles is at about 1% by mass, which is not sufficient (see for example JP-A-2004-217714). Additionally, an organic-inorganic hybrid composition prepared by binding together the surface-modifying group of inorganic fine particles and a resin via a linker is also reported (see for example JP-T-2004-352975). However, the procedures are laborious, such as the requirement of high temperature for forming the binding, while gelation is also concerned. Therefore, the resulting composition cannot exert a sufficient performance from the standpoint of moldability. Additionally, not any of these patent references includes descriptions about a transparent molded article usable as a lens with a large refractive index.

DISCLOSURE OF THE INVENTION

A material composition with a combination of great refraction properties, transparency and lightweight properties and with the refractive index under appropriate control, as well as an optical part in the constitution comprising the same has not yet been found. The development thereof has been desired.

The invention has been achieved in such circumstances. It is an object of the invention to provide an organic-inorganic hybrid composition with excellent transparency and a large refractive index, where fine particles are uniformly distributed in the resin matrix, as well as optical parts using the same such as lens material.

The inventors made investigations so as to attain the object. Consequently, the inventors found that an organic-inorganic hybrid composition prepared from raw materials such as inorganic fine particles with a specific refractive index and a specific resin, got excellent refraction property and great transparency, owing to the effect of the uniform dispersion of the inorganic fine particles therein. Thus, the invention described below was achieved.

Specifically, the invention can be specified by the items described below in [1] through [24].

[1] An organic-inorganic hybrid composition comprising a thermoplastic resin and inorganic fine particles, wherein the thermoplastic resin is a resin comprising a repeat unit in which a structure unit represented by the following formula (1) is contained in the main chain of the repeat unit, or is a resin comprising a unit structure represented by the following formula (11), or is a resin represented by the following formula (21):

Formula (1)

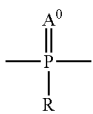

wherein R represents a substituted or unsubstituted alkyl group, a substituted or unsubstituted aryl group, a substituted or unsubstituted alkoxy group, a substituted or unsubstituted aryloxy group, or hydroxyl group; and $A^0$ represents oxygen atom, sulfur atom or selenium atom, Formula (11)

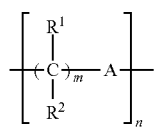

wherein $R^1$ and $R^2$ independently represent hydrogen atom, a halogen atom, a substituted or unsubstituted alkyl group, or a substituted or unsubstituted aryl group; A represents oxygen atom or sulfur atom; m represents an integer of 1 or more; n represents an integer of 2 or more; $R^1$s in the number of m may be the same or different from each other; $R^2$s in the number of m may be the same or different from each other, Formula (21)

$$[A^6-S-L^6\!\!-\!\!\!\frac{}{m6} X^6\!\!+\!\!L^7-S\text{-Poly}\!\!-\!\!\!\frac{}{n6} H$$

wherein $A^6$ represents a substituent with a functional group capable of forming a chemical bond with the surface of the inorganic fine particles; $L^6$ and $L^7$ independently represent a single bond or a divalent linker group; X6 represents a linker group of a valence of (m6+n6); Poly represents a polymer of vinyl monomers; m6 and n6 independently represent an integer of 1 to 10.

[2] An organic-inorganic hybrid composition according to [1], wherein the organic-inorganic hybrid composition comprises a resin comprising a repeat unit in which a structure unit represented by the formula (1) is contained in the main chain of the repeat unit and inorganic fine particles.

[3] An organic-inorganic hybrid composition according to [2], wherein the repeat unit is represented by the following formula (2):

Formula (2)

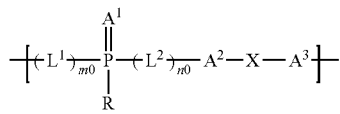

wherein R represents a substituted or unsubstituted alkyl group, a substituted or unsubstituted aryl group, a substituted or unsubstituted alkoxy group, a substituted or unsubstituted aryloxy group, or hydroxyl group; $A^1$, $A^2$ and $A^3$ independently represent oxygen atom, sulfur atom or selenium atom; $L^1$ and $L^2$ represent a substituted or unsubstituted alkylene group, a substituted or unsubstituted arylene group, or a linker group in combination thereof; X represents a linker group with 2 or more carbon atoms; and m0 and n0 independently represent 0 or 1.

[4] An organic-inorganic hybrid composition according to [1], wherein the organic-inorganic hybrid composition comprises a thermoplastic resin comprising at least one type of the unit structure represented by the formula (11) and inorganic fine particles.

[5] An organic-inorganic hybrid composition according to [4], wherein the polymer composing the thermoplastic resin comprises at least one type of the unit structure represented by the formula (11) via a chemical bond.

[6] An organic-inorganic hybrid composition according to [4] or [5], wherein the thermoplastic resin comprises a functional group selected from the group consisting of

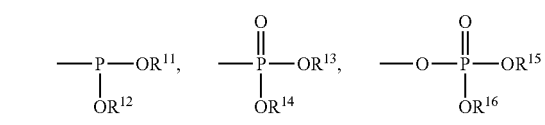

wherein $R^{11}$ to $R^{16}$ independently represent hydrogen atom, a substituted or unsubstituted alkyl group, or a substituted or unsubstituted aryl group, $-SO_3H$, $-OSO_3H$, $-CO_2H$, $-OH$, and $-Si(OR^{17})_x R^{18}_{3-x}$ wherein $R^{17}$ and $R^{18}$ independently represent hydrogen atom, a substituted or unsubstituted alkyl group or a substituted or unsubstituted aryl group; and x represents an integer of 1 to 3.

[7] An organic-inorganic hybrid composition according to [1], comprising a thermoplastic resin represented by the formula (21) and inorganic fine particles.

[8] An organic-inorganic hybrid composition according to any one of [1] to [7], wherein the number average particle size of the inorganic fine particles is 1 to 15 nm.

[9] An organic-inorganic hybrid composition according to any one of [1] to [8], wherein the refractive index of the inorganic fine particles at a wavelength of 589 nm is 1.90 to 3.00.

[10] An organic-inorganic hybrid composition according to any one of [1] to [9], wherein the inorganic fine particles are at least one type selected from the group consisting of zirconium oxide, zinc oxide, tin oxide and titanium oxide.

[11] An organic-inorganic hybrid composition according to any one of [1] to [10], wherein the optical transmission ratio of the organic-inorganic hybrid composition at a wavelength of 589 nm on a 1-mm thickness basis is 70% or more.

[12] An organic-inorganic hybrid composition according to any one of [1] to [11], wherein the organic-inorganic hybrid composition is thermoplastic.

[13] An organic-inorganic hybrid composition according to any one of [1] to [12], wherein the organic-inorganic hybrid composition is a solid with no content of any solvent.

[14] A method for producing an organic-inorganic hybrid composition comprising dispersing inorganic fine particles in a thermoplastic resin, wherein the thermoplastic resin is a resin comprising a repeat unit in which a structure unit represented by the following formula (1) is contained in the main chain of the repeat unit, or is a resin comprising a unit structure represented by the following formula (11), or is a resin represented by the following formula (21):

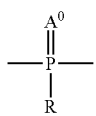

Formula (1)

wherein R represents a substituted or unsubstituted alkyl group, a substituted or unsubstituted aryl group, a substituted or unsubstituted alkoxy group, a substituted or unsubstituted aryloxy group, or hydroxyl group; and $A^0$ represents oxygen atom, sulfur atom or selenium atom,

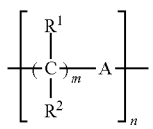

Formula (11)

wherein $R^1$ and $R^2$ independently represent hydrogen atom, a halogen atom, a substituted or unsubstituted alkyl group, or a substituted or unsubstituted aryl group; A represents oxygen atom or sulfur atom; m represents an integer of 1 or more; n represents an integer of 2 or more; $R^1$s in the number of m may be the same or different from each other; $R^2$s in the number of m may be the same or different from each other,

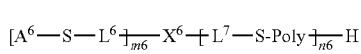

Formula (21)

wherein $A^6$ represents a substituent with a functional group capable of forming a chemical bond with the surface of the inorganic fine particles; $L^6$ and $L^7$ independently represent a single bond or a divalent linker group; X6 represents a linker group of a valence of (m6+n6); Poly represents a polymer of vinyl monomers; m6 and n6 independently represent an integer of 1 to 10.

[15] A method for producing an organic-inorganic hybrid composition according to [14], comprising surface-treating the inorganic fine particles in water, an alcohol or a mixture of water and an alcohol in the presence of a surface-treating agent, extracting the surface-treated inorganic fine particles into an organic solvent and mixing the extracted inorganic fine particles with the thermoplastic resin.

[16] A method for producing an organic-inorganic hybrid composition according to [14] or [15], comprising mixing a dispersion of the inorganic fine particles in an organic solvent with the thermoplastic resin, and distilling off the solvent from the resulting mixture solution.

[17] A method for producing an organic-inorganic hybrid composition according to [14] or [15], comprising mixing a dispersion of the inorganic fine particles in an organic solvent with the thermoplastic resin, and reprecipitating the resulting mixture solution.

[18] A method for producing an organic-inorganic hybrid composition according to any one of [14] to [17], wherein the inorganic fine particles are dispersed in the thermoplastic resin in the presence of a dispersant.

[19] An organic-inorganic hybrid composition produced by the method according to any one of [14] to [18].

[20] A molded article comprising an organic-inorganic hybrid composition according to any one of [1] to [13] or [19], wherein the maximum thickness is 0.1 mm or more.

[21] A molded article according to [20], wherein the optical transmission ratio at a wavelength of 589 nm on a 1-mm thickness basis is 70% or more and the refractive index is 1.63 or more.

[22] A method for producing a molded article comprising molding the organic-inorganic hybrid composition according to any one of [1] to [13] or [19], using a mold.

[23] An optical part comprising a molded article according to [21].

[24] An optical part according to [22], wherein the optical part is a lens substrate.

In accordance with the invention, an organic-inorganic hybrid composition with excellent transparency and a large refractive index as well as optical parts using the same can be provided. In accordance with the invention, further, optical parts with excellent mechanical strength and heat resistance can readily be provided.

BEST MODE FOR CARRYING OUT THE INVENTION

The organic-inorganic hybrid composition of the invention and the method for producing the same, and optical parts in the constitutions comprising the same are described in detail below. The descriptions about the constitutive requirements as described below are sometimes based on typical embodiments for carrying out the invention. However, the invention is never limited to such embodiments. Herein, the numerical range expressed with "to" means the range where the numerical figures before and after the word "to" are the lower limit and the upper limit, respectively.

[Organic-Inorganic Hybrid Composition]

The organic-inorganic hybrid composition of the invention comprises inorganic fine particles and a thermoplastic resin with a specific structure. In the organic-inorganic hybrid composition of the invention, the inorganic fine particles are dispersed in the thermoplastic resin.

The organic-inorganic hybrid composition of the invention is preferably a solid. The content of solvents therein is preferably 25% by mass or less, more preferably 20% by mass or less, still more preferably 10% by mass or less. Most preferably, no solvents are contained therein.

The refractive index of the organic-inorganic hybrid composition of the invention is preferably 1.60 or more, more preferably 1.63 or more, further more preferably 1.65 or more, still more preferably 1.67 or more and particularly preferably 1.70 or more, at a wavelength of 589 nm.

The optical transmission ratio of the organic-inorganic hybrid composition of the invention is preferably 70% or more, more preferably 75% or more, still more preferably 80% or more, further more preferably 85% or more, and particularly preferably 90% or more at a wavelength of 589 nm on a 1-mm thickness basis. Additionally, the optical transmission ratio at a wavelength of 405 nm on a 1-mm thickness basis is preferably 60% or more, more preferably 65% or more, particularly preferably 70% or more. The optical transmission ratio at a wavelength of 589 nm on a 1-mm thickness basis is preferably 70% or more, more preferably 75% or more, particularly preferably 80% or more. At 70% or more, a lens material with preferable properties can readily be obtained. Additionally, the optical transmission ratio on a 1-mm thickness basis in accordance with the invention is a value obtained by molding an organic-inorganic hybrid composition to prepare a substrate of a thickness of 1 mm and then measuring the transmission ratio with a UV-ultraviolet absorption spectrometer (UV-3100 manufactured by Shimadzu Corporation).

The glass transition temperature of the organic-inorganic hybrid composition of the invention is preferably 100° C. to 400° C., more preferably 130° C. to 380° C. When the glass transition temperature is 100° C. or more, sufficient thermal resistance can readily be obtained. When the glass transition temperature is 400° C. or less, the organic-in organic hybrid composition is likely to be molded readily.

The thermoplastic resin and the inorganic fine particles as the essential constitutive components of the organic-inorganic hybrid composition of the invention are sequentially described below. Other than the essential constitutive components of the invention may be contained resins never satisfying the conditions in accordance with the invention and additives such as dispersants, plasticizers and release agents.

[Thermoplastic Resin]

The organic-inorganic hybrid composition of the invention includes a thermoplastic resin containing a repeat unit with a structure unit represented by the formula (1) in the main chain of the repeat unit, a thermoplastic resin with a unit structure represented by the formula (11) or a thermoplastic resin represented by the formula (21).

The thermoplastic resin for use in accordance with the invention is at a refractive index of 1.50 or more, preferably 1.55 or more, more preferably 1.60 or more. The refractive index in accordance with the invention is a value as measured toward the light at a wavelength of 589 nm with Abbe refractometer ("DR-M4" manufactured by Atago Co., Ltd.).

The glass transition temperature of the thermoplastic resin for use in accordance with the invention is preferably 50 to 400° C., more preferably 80° C. to 380° C. When such resin with a glass transition temperature of 50° C. or more is used, an optical part with sufficient thermal resistance is readily obtained. When such resin with a glass transition temperature of 400° C. or less is used, the resin is likely to be molded readily.

The optical transmission ratio of the thermoplastic resin for use in accordance with the invention at a wavelength of 589 nm is preferably 75% or more, more preferably 80% or more, still more preferably 85% or more. The number average molecular weight of the thermoplastic resin for use in accordance with the invention is preferably 1,000 to 500,000, more preferably 3,000 to 300,000, still more preferably 5,000 to 200,000, and particularly preferably 10,000 to 100,000. When the number average molecular weight thereof is 1,000 or more, an organic-inorganic hybrid composition with a practically applicable mechanical strength is readily obtained. When the number average molecular weight thereof is 500,000 or less, the resulting organic-inorganic hybrid composition is likely to be molded readily. Polymers composing the thermoplastic resin for use in accordance with the invention may satisfactorily be any addition-series polymers and condensation-series polymers, with no limitation to the types of the polymers.

Then, the thermoplastic resin containing a repeat unit with a structure unit represented by the formula (1) in the main chain of the repeat unit is now described.

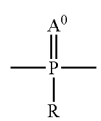

Formula (1)

In the formula (1), R represents a substituted or unsubstituted alkyl group, a substituted or unsubstituted aryl group, a substituted or unsubstituted alkoxy group, a substituted or unsubstituted aryloxy group, or hydroxyl group. R is preferably a substituted or unsubstituted alkyl group, a substituted or unsubstituted aryl group, a substituted or unsubstituted alkoxy group, or a substituted or unsubstituted aryloxy group. The carbon atoms in the alkyl group possibly represented by R are preferably one to 20, more preferably one to 18, still more preferably one to 15. Specific examples thereof include methyl group, ethyl group, propyl group, isopropyl group and cyclohexyl group. The carbon atoms in the aryl group possibly represented by R are preferably 6 to 20, more preferably 6 to 18, still more preferably 6 to 15. Specific examples thereof include phenyl group, 1-naphthyl group, and 2-naphthyl group. The carbon atoms in the alkoxy group possibly represented by R are preferably one to 20, more preferably one to 18, still more preferably one to 15. Specific examples of the alkyl moiety in the alkoxy group are those listed as the specific examples of the alkyl group. The carbon atoms in the aryloxy group possibly represented by R are preferably 6 to 20, more preferably 6 to 18, still more preferably 6 to 15. Specific examples of the aryl moiety in the aryloxy group are those listed as the specific examples of the aryl group.

Any substituents may be used for substitution in the alkyl group, the aryl group, the alkoxy group and the aryloxy group, with no specific limitation, and include for example halogen atoms (for example, fluorine atom, chlorine atom, bromine atom, iodine atom), alkyl groups (for example, methyl group, ethyl group), aryl groups (for example, phenyl group, naphthyl group), alkenyl groups, alkynyl groups, cyano group, carboxyl group, alkoxycarbonyl groups (for example, methoxycarbonyl group), aryloxycarbonyl group (for example, phenoxycarbonyl group), substituted or unsubstituted carbamoyl groups (for example, carbamoyl group, N-phenylcarbamoyl, N,N-dimethylcarbamoyl groups), alkylcarbonyl groups (for example, acetyl group), arylcarbonyl groups (for example, benzoyl group), nitro group, acylamino groups (for example, acetamide group, ethoxycarbonylamino group), sulfoneamide groups (for example, methanesulfoneamide group), imide groups (for example, succinimide group, phthalimide group), imino groups (for example, benzylideneamino group), alkoxy groups (for example, methoxy group), aryloxy group (for example, phenoxy group), acyloxy groups (for example, acetoxy group), alkylsulfonyloxy groups (for example, methanesulfonyloxy group), arylsulfonyloxy groups (for example, benzenesulfonyloxy group), sulfo group, substituted or unsubstituted sulfamoyl groups (for example, sulfamoyl group, N-phenylsulfamoyl group), alkylthio groups (for example, methylthio group), arylthio groups (for example, phenylthio group), alkylsulfonyl groups (for example, methanesulfonyl group), arylsulfonyl group (for example, benzenesulfonyl group) and heterocyclic rings.

The substituents in R may further be substituted. When plural substituents exist, the individual substituents may be the same or different. Additionally, such substituents may satisfactorily form a condensed ring with R. The substituents are preferably halogen atoms, alkyl groups, aryl groups, alkoxy groups, aryloxy groups, alkylthio groups, arylthio groups, carboxyl group, alkoxycarbonyl groups, aryloxycarbonyl groups, alkylcarbonyl groups, and arylcarbonyl groups. More preferably, the substituents are alkyl groups, aryl groups, alkoxy groups and aryloxy groups. Still more preferably, the substituents are alkyl groups and aryl groups.

$A^0$ represents oxygen atom, sulfur atom or selenium atom, preferably oxygen atom or sulfur atom.

The repeat unit with the structure unit represented by the formula (1) in the main chain of the repeat unit is preferably represented by the formula (2).

Formula (2)

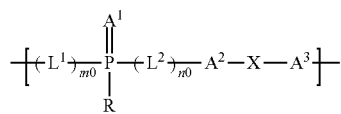

In the formula (2), R has the same meaning as the R in the formula (1), while the preferable range thereof is the same as the R in the formula (1). $A^1$, $A^2$ and $A^3$ independently represent oxygen atom, sulfur atom or selenium atom, preferably oxygen atom or sulfur atom. $L^1$ and $L^2$ represent a substituted or unsubstituted alkylene group, a substituted or unsubstituted arylene group, or a linker group in combination thereof. The carbon atoms in the alkylene group possibly represented by $L^1$ and $L^2$ are preferably 2 to 20, more preferably 2 to 15, still more preferably 2 to 12. Specific examples thereof include methylene group, ethylene group, propylene group and cyclohexene group. The carbon atoms in the arylene group possibly represented by $L^1$ and $L^2$ are preferably 6 to 20, more preferably 6 to 15, still more preferably 6 to 12. Specific examples thereof include phenylene group, biphenylene group, and naphthylene group. The carbon atoms in the linker group in combination of the alkylene group and the arylene group, as possibly represented by $L^1$ and $L^2$, are preferably 7 to 20, more preferably 7 to 15, still more preferably 7 to 12. Specific examples thereof include a group in combination of one or more groups selected from the group consisting of methylene group, ethylene group, propylene group and cyclohexene group and one or more groups selected from phenylene group, biphenylene group and naphthylene group. Any substituents for the alkylene group, the arylene group and the linker group in combination thereof may be satisfactory, with no specific limitation. The substituents may be those listed as the substituents in the R in the formula (1), while the preferable range thereof is the same as the range for the R in the formula (1). X represents a divalent linker group with 2 or more carbon atoms, preferably 2 to 40 carbon atoms, more preferably 2 to 30 carbon atoms. X is more preferably one type selected from the group consisting of the following structural formulas.

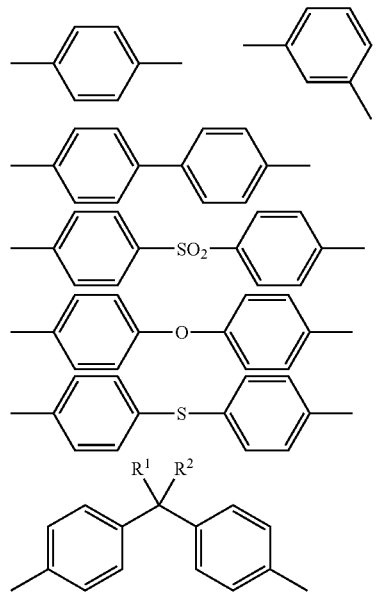

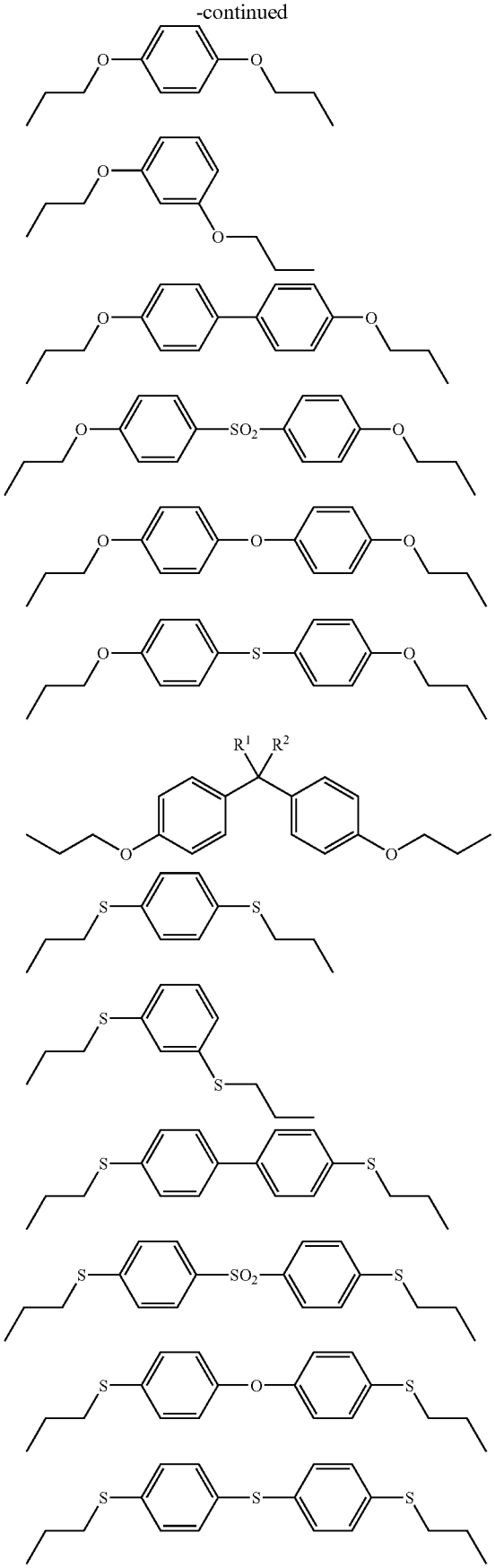

-continued

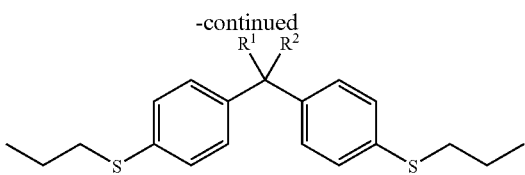

R[1] and R[2] represent hydrogen atom, an alkyl group or an aryl group. R[1] and R[2] together may form a ring structure. Examples of the ring structure formed by R[1] and R[2] together include those described below.

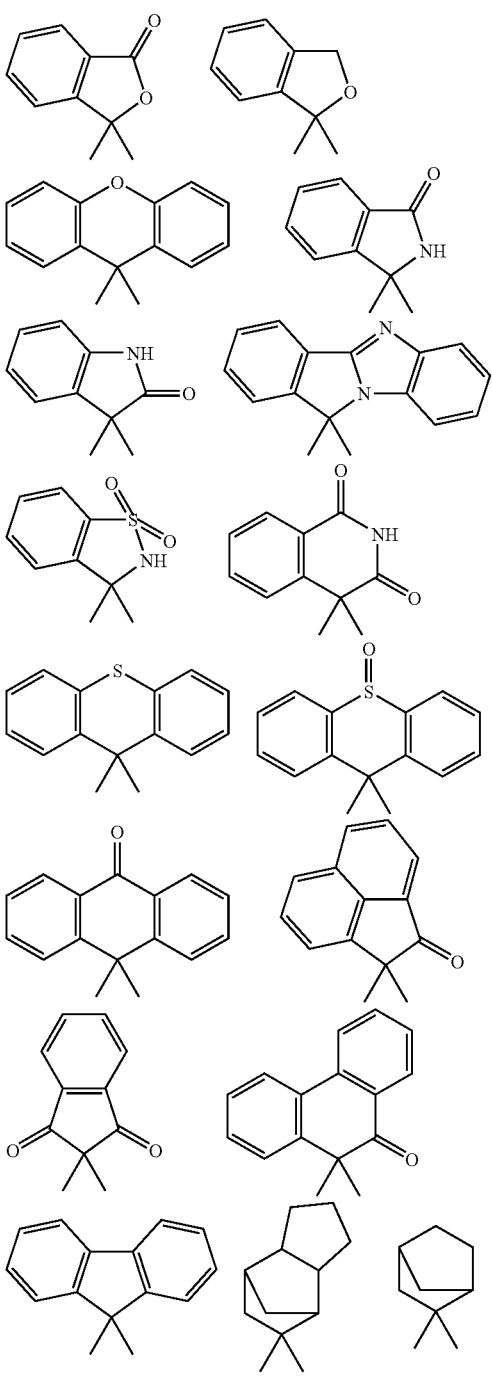

-continued

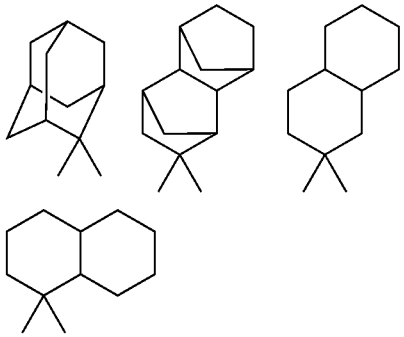

The linker group possibly represented by X may have a substituent with no specific limitation. As such substituent, the substituents listed for the R in the formula (1) may be applicable. Preferable range thereof may be the same as described above. m0 and n0 independently represent 0 or 1. Preferably, both m0 and n0 are zero.

In the structure unit represented by the formula (2), in particular, structure units represented by the following formulas (3) and (4) may be included. These structure units may be used preferably in accordance with the invention.

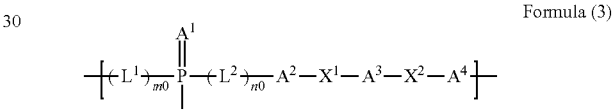

Formula (3)

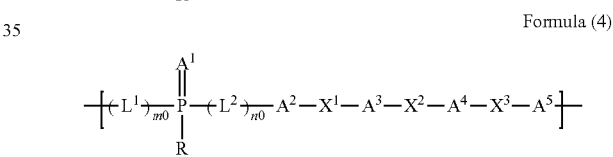

Formula (4)

In the formulas (3) and (4), R has the same meaning as the R in the formula (1). The preferable range thereof is also the same as R. $A^1$, $A^2$, $A^3$, $A^4$ and $A^5$ independently represent oxygen atom, sulfur atom or selenium atom, preferably oxygen atom or sulfur atom. $L^1$ and $L^2$ have the same meanings as the $L^1$ and $L^2$ in the formula (2), while the preferable ranges thereof are the same. $X^1$, $X^2$ and $X^3$ independently represent a linker group with 2 or more carbon atoms, while the preferable ranges thereof are the same as the $X^1$ and $X^2$ in the formula (2). m0 and n0 independently represent 0 or 1.

The resin for use in accordance with the invention may satisfactorily have one type of the repeat unit with a structure unit represented by the formula (1) or one type or more of other repeat units with a structure unit represented by the formula (1), within one molecule. When the resin is a copolymer with two types or more repeat units within the molecule, the resin may be a block copolymer or a random copolymer or a graft copolymer.

Specific examples of the preferable repeat unit contained in the resin are listed below, which can be used in accordance with the invention. However, the resin for use in accordance with the invention is never limited to those with such repeat units. a, b, c, d, x and y in the repeat units represent copolymerization ratios (in molar ratio).

P-1
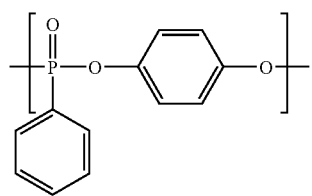
P-2
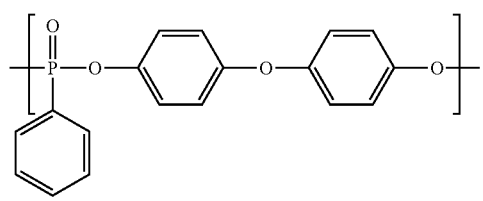
P-3
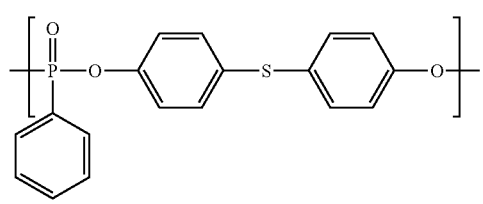
P-4
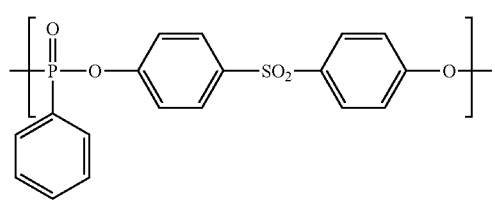
P-5
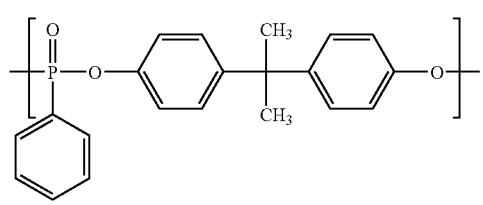
P-6
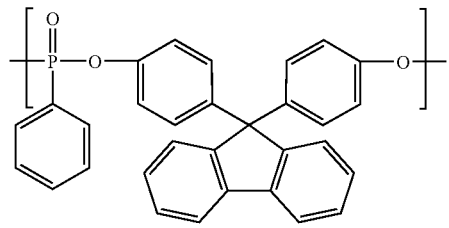
P-7
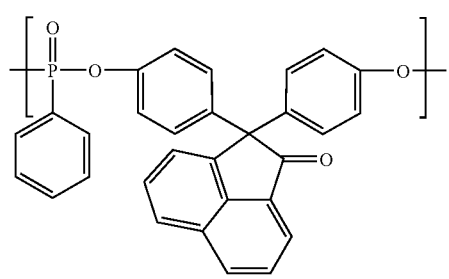
-continued
P-8
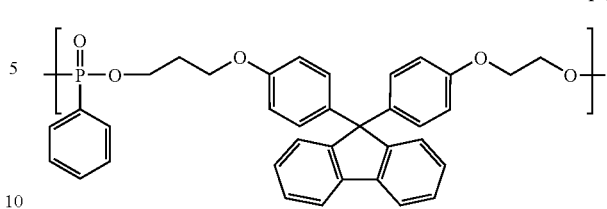
P-9
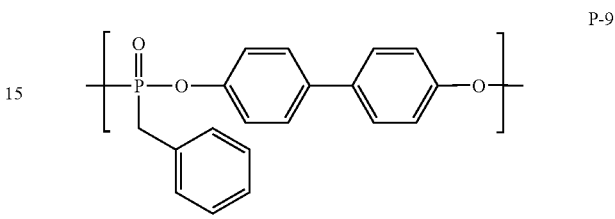
P-10
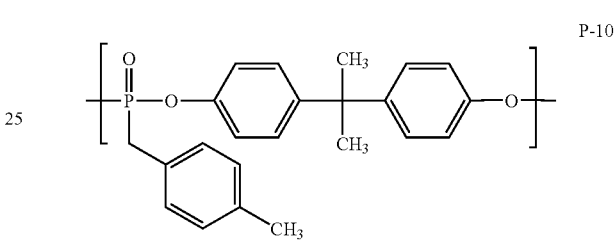
P-11
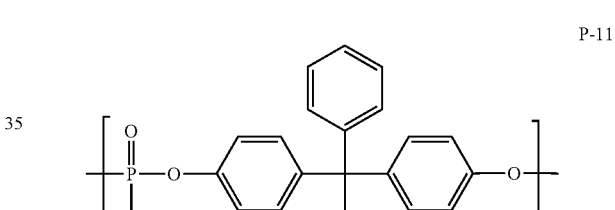
P-12
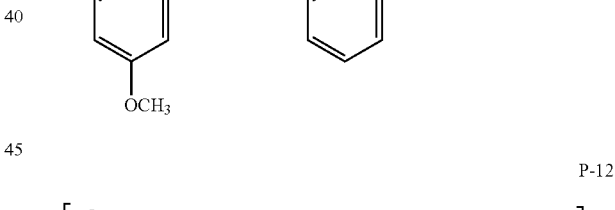
P-13
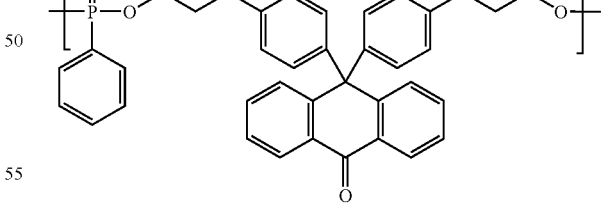
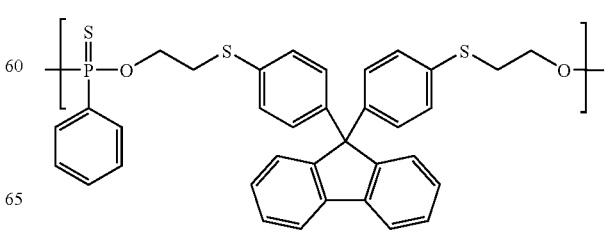

P-14
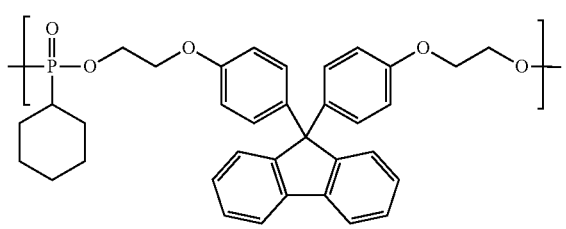
P-15
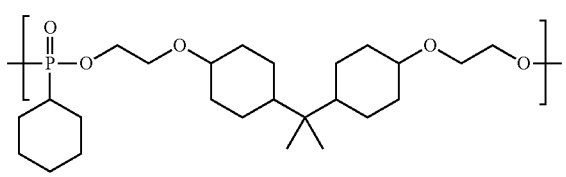
P-16
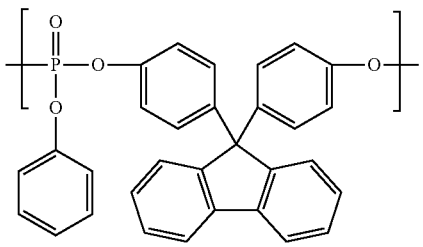
P-17
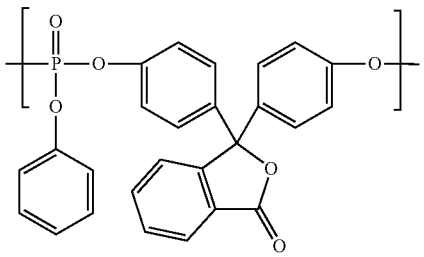
P18
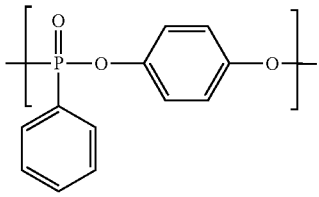
P-19
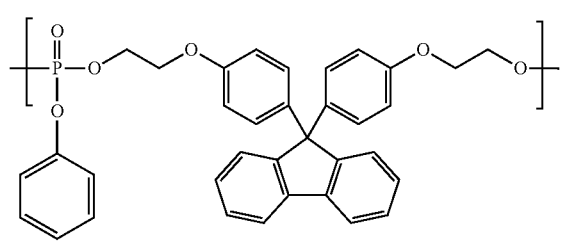
P-20
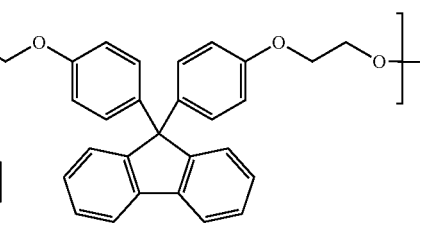
P-21
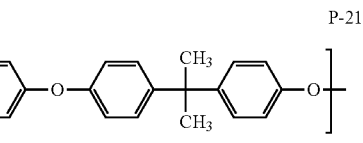
P-22
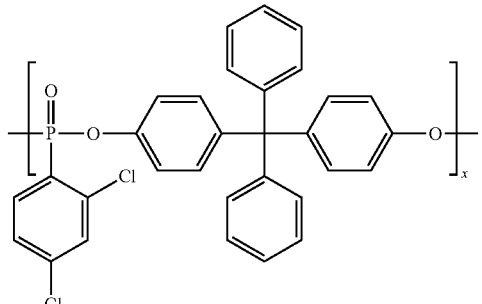
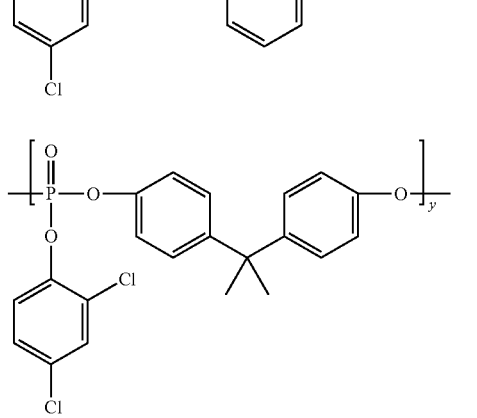
x:y = 30:70
P-23
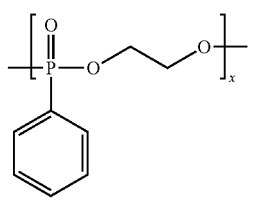
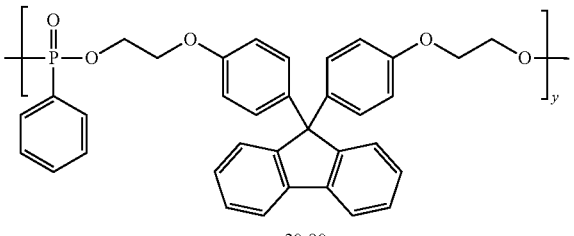
x:y = 20:80

P-22

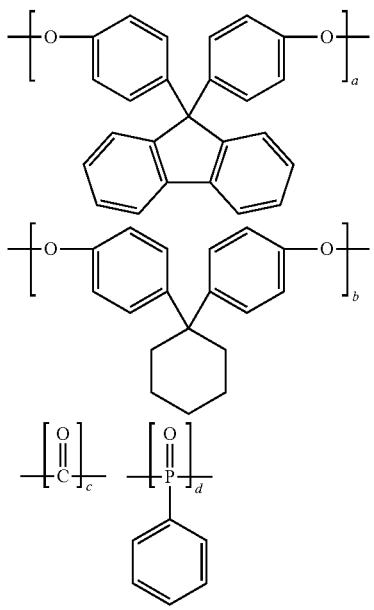

$a:b:c:d = 37.5:12.5:12.5:37.5$

The resin for use in accordance with the invention can be synthetically prepared by known methods. For example, the resin can be synthetically prepared by a polycondensation reaction between a phosphate derivative and a hydroxyl group-containing compound, as described in New Polymer Experimentals 2, Polymer Synthesis and Reaction (2) Condensation-series Polymer Synthesis (edited by Academic Polymer Association (Ko-bunshi Gakkai), Paragraph 138—Paragraph 143, and Journal of Polymer Science Part B. Vol. 38, Paragraph 2409—Paragraph 2421 (2000).

For the organic-inorganic hybrid composition of the invention, one type of the resin with a structure unit represented by the formula (1) may be used singly or two types or more of such resins may be mixed together for use. Additionally, such resin may be mixed with a resin without any structure unit represented by the formula (1), for use. The resin may be mixed with for example a resin with a repeat unit without any phosphorus atom, for use. The type of the resin with a repeat unit without any phosphorus atom is not limited specifically. Among resins satisfying the optical physico-chemical properties, thermal physico-chemical properties and molecular weight of the preferable thermoplastic resin described below, selection may preferably be done for use.

Then, the thermoplastic resin with a unit structure represented by the formula (11) is now described below.

The thermoplastic resin characteristically contains at least one type of the unit structure represented by the formula (11). The unit structure represented by the formula (11) may be bonded via a chemical bond to the polymers composing the thermoplastic resin or may be included in a compound contained in the thermoplastic resin. From the standpoint of suppressing the phase separation between the thermoplastic resin and inorganic fine particles, an embodiment of the unit structure bonded via a chemical bond to the polymers composing the thermoplastic resin is preferable. Herein, the "chemical bond" includes for example covalent bonds, ionic bonds, coordination bonds and hydrogen bonds.

The total content of the unit structure represented by the formula (11) in the thermoplastic resin is preferably 0.01 to 10% by mass, more preferably 0.05 to 8% by mass, still more preferably 0.1 to 5% by mass. When the total content is 0.01% by mass or more, the effect of improving releasability can readily be obtained. When the total content is 10% by mass or less, phase separation from the resin matrix hardly occurs, so that the transmission ratio and refractive index of the whole resin is likely to be raised readily. The unit structure represented by the formula (11) is described in detail hereinbelow.

Formula (11)

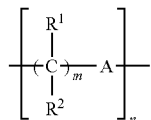

In the formula (11), $R^1$ and $R^2$ independently represent hydrogen atom, a halogen atom, a substituted or unsubstituted alkyl group, or a substituted or unsubstituted aryl group; A represents oxygen atom or sulfur atom; m represents an integer of 1 or more; n represents an integer of 2 or more. $R^1$s in the number of m may be the same or different from each other. $R^2$s in the number of n may be the same or different from each other.

The halogen atom selectable as $R^1$ and $R^2$ includes for example fluorine atom, chlorine atom, bromine atom and iodine atom, preferably including fluorine atom, chlorine atom and bromine atom. The alkyl group has preferably one to 10, more preferably one to 9, still more preferably one to 8 carbon atoms. The aryl group has preferably 6 to 18, more preferably 6 to 16 and still more preferably 6 to 12 carbon atoms. The alkyl group and the aryl group may individually be substituted satisfactorily. The substituent therefor includes for example halogen atoms (for example, fluorine atom, chlorine atom, bromine atom, iodine atom) and alkoxy groups (for example, methoxy group, ethoxy group), other than these alkyl groups and aryl groups. Specific examples of substituted alkyl groups include aralkyl group. The aralkyl group has preferably 7 to 18, more preferably 7 to 16, still more preferably 7 to 14 carbon atoms. More preferably, $R^1$ and $R^2$ are hydrogen atom, methyl group, ethyl group, propyl group, trifluoromethyl group, phenyl group and benzyl group. Still more preferably, $R^1$ and $R^2$ are hydrogen atom, methyl group, phenyl group and benzyl group. Particularly preferably, $R^1$ and $R^2$ are hydrogen atom and methyl group.

A represents oxygen atom or sulfur atom. From the standpoint of suppressing coloring, preferably, oxygen atom is selected.

m represents the number of the repeat units and is an integer of 1 or more. Preferably, m is 1 to 6. More preferably, m is 1 to 4. Still more preferably, m is 2. n represents the number of the repeat units, and is an integer of 2 or more.

Preferably, n is 2 to 1,000. More preferably, n is 3 to 500. Still more preferably, n is 3 to 300. When the number of the repeat units is smaller than 2, sufficient releasability cannot be obtained. When the number of the repeat units is 1,000 or less, phase separation from the resin matrix hardly occurs, so that the transmission ratio and the refractive index of the whole thermoplastic resin are likely to be hardly decreased.

One preferable embodiment of the unit structure represented by the formula (11) is a unit structure represented by the following formula (11a).

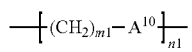

Formula (11a)

In the formula (11a), m1 represents an integer of 1 or more; $A^{10}$ represents oxygen atom or sulfur atom; n1 represents an integer of 2 or more. Preferable ranges of m1, $A^{10}$ and n1 are the same as the preferable ranges of m, A and n in the formula (11).

Another preferable unit structure represented by the formula (11) includes the unit structure represented by the following formula (11b).

Formula (11b)

In the formula (11b), n2 represents an integer of 2 or more. The preferable range of n2 is the same as the preferable range of n in the formula (11).

In accordance with the invention, the unit structure represented by the formula (11) may be introduced in the polymers composing the thermoplastic resin, for use. The site for introducing the unit structure may be a polymer end or the main chain of a polymer or a side chain thereof. Additionally, the unit structure may satisfactorily be introduced in plural such sites.

As a method for introducing the unit structure represented by the formula (11) in the polymers, there are listed a polymerization method using an initiator, a terminator, a chain transfer agent, and a monomer, all of which have the unit structure, and a method comprising allowing a compound with a unit structure represented by any of the formulas (11) to react with a functional group in the polymers.

For producing a polymer with such unit structure by polymerization using a monomer with the unit structure represented by the formula (11), any monomer polymerizable may be used with no specific limitation. As such monomer, for example, a compound represented by the formula (12) may be exemplified.

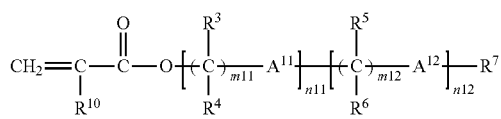

Formula (12)

In the formula (12), $R^{10}$ represents hydrogen atom or methyl group; $R^3$ through $R^6$ independently represent hydrogen atom, a halogen atom, a substituted or unsubstituted alkyl group or a substituted or unsubstituted aryl group; $A^{11}$ and $A^{12}$ independently represent oxygen atom or sulfur atom; m11 and m12 independently represent an integer of 1 or more; n11 and n12 independently represent an integer of 2 or more. When m11 is 2 or more, $R^3$s and $R^4$s in the number of m11 may be the same or different from each other. When m12 is 2 or more, $R^5$s and $R^6$s in the number of m12 may be the same or different from each other. $R^7$ represents hydrogen atom, a substituted or unsubstituted alkyl group or a substituted or unsubstituted aryl group.

The preferable ranges of $R^3$ to $R^6$ in the formula (12) may be the same as the preferable ranges of the $R^1$ and $R^2$ in the formula (11). The preferable ranges of $A^{11}$ and $A^{12}$ in the formula (12) may be the same as the preferable range of the A in the formula (11). The preferable ranges of m11 and m12 in the formula (12) may be the same as the preferable range of the m in the formula (11). Further, the preferable ranges of n11 and n12 in the formula (12) may be the same as the preferable range of the n in the formula (11).

The alkyl group selectable as $R^7$ in the formula (12) has carbon atoms of preferably one to 10, more preferably one to 9, still more preferably one to 8. The aryl group has carbon atoms of preferably 6 to 18, more preferably 6 to 16, still more preferably 6 to 12. The alkyl group and the aryl group may individually be substituted. The substituents therefor include halogen atoms (for example, fluorine atom, chlorine atom, bromine atom, iodine atom), and alkoxy groups (for example, methoxy group, ethoxy group), other than these alkyl group and aryl group. $R^7$ is preferably hydrogen atom, an alkyl group, an aryl group and an alkylaryl group.

Among compounds represented by the formula (12), a compound represented by the following formula (12a) can be used preferably.

Formula (12a)

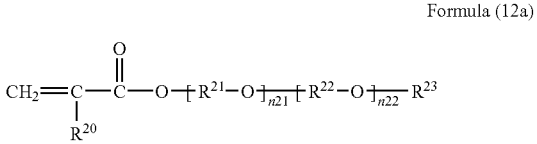

In the formula (12a), $R^{20}$ represents hydrogen atom or methyl group; $R^{21}$ and $R^{22}$ independently represent a substituted or unsubstituted alkylene group; n21 and n22 independently represent an integer of 2 or more; $R^{23}$ represents hydrogen atom, a substituted or unsubstituted alkyl group, or a substituted or unsubstituted aryl group.

The alkylene group as $R^{21}$ and $R^{22}$ has one to 8, preferably one to 6, more preferably one to 4 carbon atoms. The alkylene group may be substituted. The substituent therefor includes for example alkyl groups and aryl groups and additionally includes for example halogen atoms (for example, fluorine atom, chlorine atom, bromine atom, iodine atom), and alkoxy groups (for example, methoxy group, ethoxy group). Specific examples of the alkylene group include ethylene group, methylethylene group, propylene group and butylene group.

The preferable ranges of n21 and n22 in the formula (12a) are the same as the preferable range of the n in the formula (11). Additionally, the preferable range of $R^{23}$ in the formula (12a) is the same as the preferable range of the $R^7$ in the formula (12).

The thermoplastic resin for use in accordance with the invention may be a polymer containing a block comprising a unit structure represented by the formula (11). The repeat unit in such block includes for example a structure represented by the following formula (13).

same or different from each other. $B^1$ and $B^2$ independently represent cyano group, carboxymethyl group or carboxyethyl group.

The preferable range of $R^{31}$ to $R^{34}$ in the formula (13) is the same as the preferable range of the $R^1$ and $R^2$ in the formula (11). The preferable range of $A^{31}$ and $A^{32}$ in the formula (13) is the same as the preferable range of the A in the formula (11). Additionally, the preferable range of m31 and m32 in the formula (13) is the same as the preferable range of the m in the formula (13). Furthermore, the preferable range of n31 and n32 is the same as the preferable range of the n in the formula (11).

Among the repeat unit represented by the formula (13), the repeat unit represented by the following formula (13a) can be preferably used.

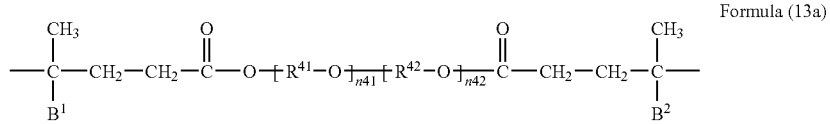

Formula (13a)

In the formula (13a), $R^{41}$ and $R^{42}$ independently represent a substituted or unsubstituted alkylene group; n41 and n42 independently represent an integer of 2 or more; $B^1$ and $B^2$ independently represent cyano group, carboxymethyl group or carboxyethyl group.

The preferable range of $R^{41}$ and $R^{42}$ is the same as the preferable range of the $R^{21}$ and $R^{22}$ in the formula (12a). The preferable range of n41 and n42 in the formula (13a) is the same as the preferable range of the n in the formula (11).

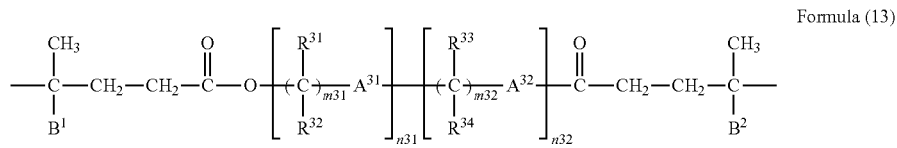

Formula (13)

In the formula (13), $R^{31}$ to $R^{34}$ independently represent hydrogen atom, a halogen atom, a substituted or unsubstituted alkyl group, or a substituted or unsubstituted aryl group; $A^{31}$ and $A^{32}$ independently represent oxygen atom or sulfur atom; m31 and m32 independently represent an integer of 1 or more; n31 and n32 independently represent an integer of 2 or more. When m31 is 2 or more, $R^{31}$s and $R^{32}$s in the number of m31 may be the same or different from each other. When m32 is 2 or more, $R^{33}$s and $R^{34}$s in the number of m32 may be the Specific examples of the monomer with the unit structure represented by the formula (11) are listed below as S-1 through S-25, and S-31 through S-35. Monomers usable in accordance with the invention are not limited to such specific examples. Further, specific examples of the repeat unit in the block with the unit structure represented by the formula (11) are listed as S-26 to S-30. However, the repeat unit in the block usable in accordance with the invention is not limited to these specific examples. Additionally, hereinbelow, n and n' represent an integer of 2 or more, while x represents an integer of 1 or more.

S-1 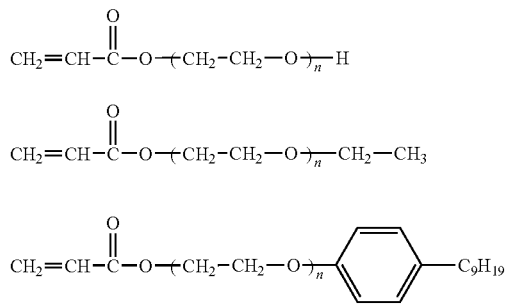
S-2 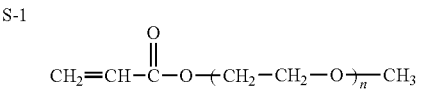
S-3 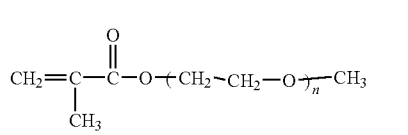
S-4 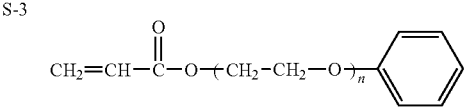
S-5 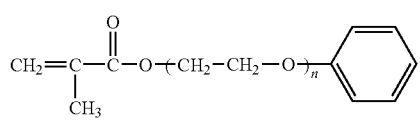
S-6 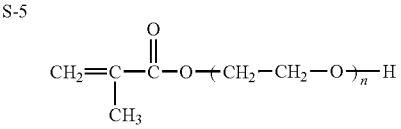
S-7 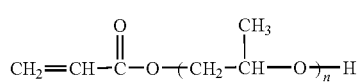
S-8 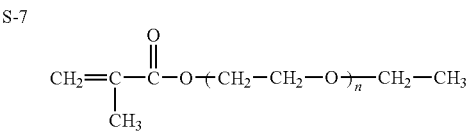
S-9 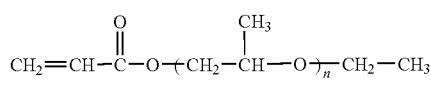
S-10 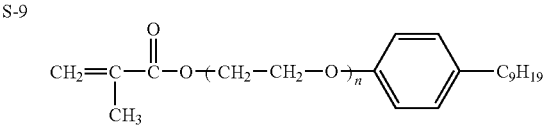
S-11 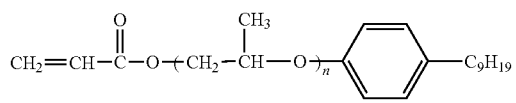
S-12 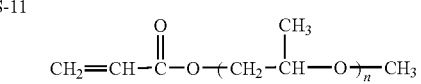
S-13 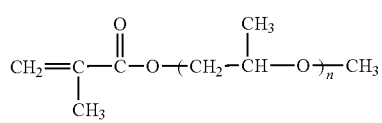
S-14 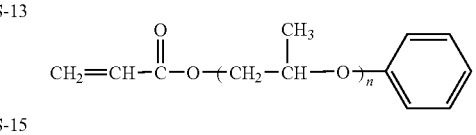
S-15 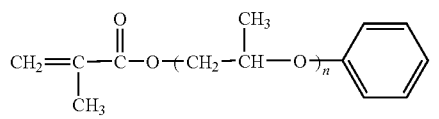
S-16 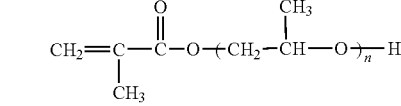
S-17 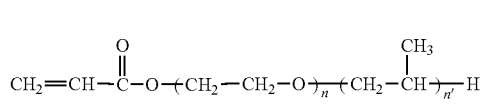
S-18 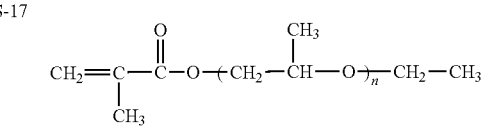
S-19 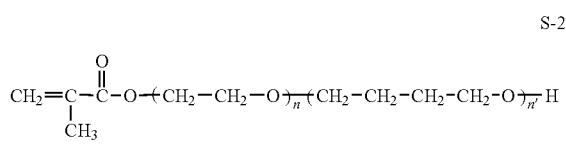
S-20 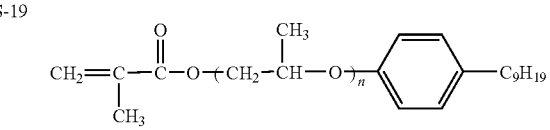
S-21 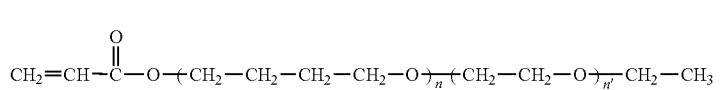
S-22 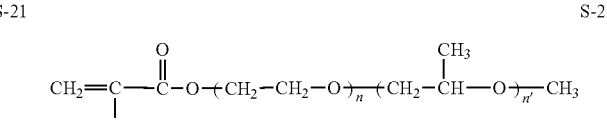
S-23 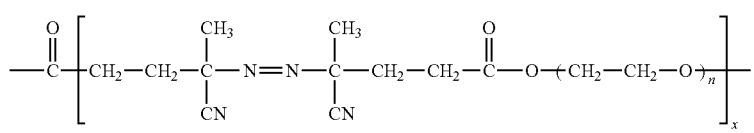
S-24 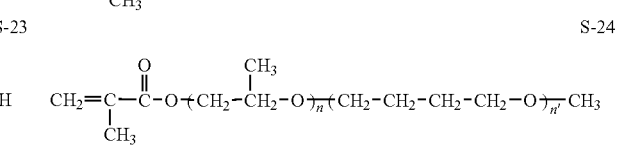
S-25 
S-26 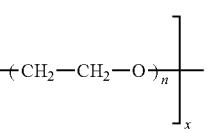

-continued

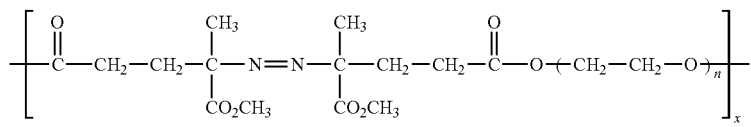

S-27

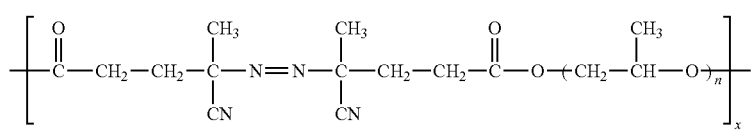

S-28

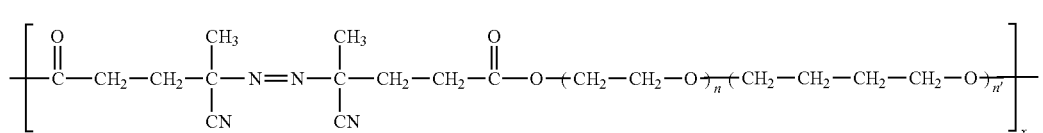

S-29

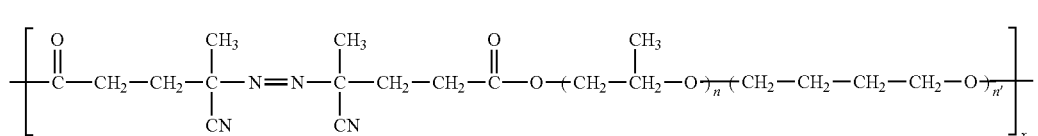

S-30

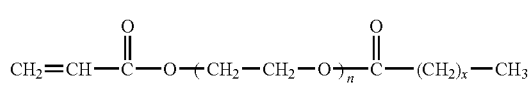

S-31

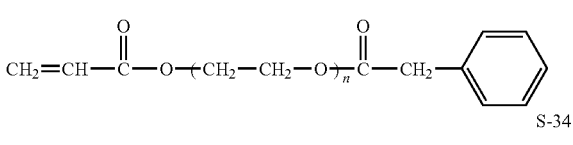

S-32

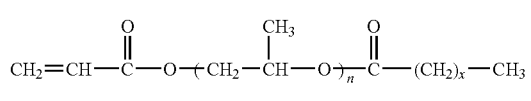

S-33

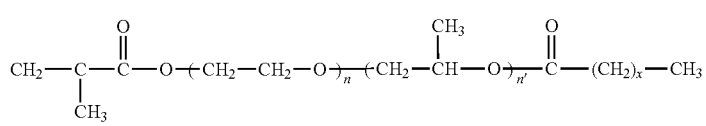

S-34

S-35

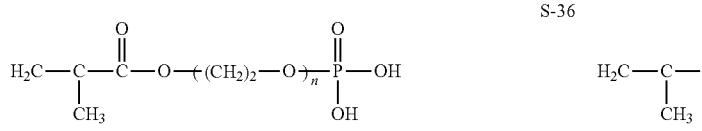

S-36

S-37

The thermoplastic resin for use in accordance with the invention may contain a compound with a unit structure represented by the formula (11), other than the polymers. Such compound may be contained together with the polymer with the unit structure represented by the formula (11) in the thermoplastic resin. Otherwise, the compound may be contained together with a polymer without any unit structure represented by the formula (11) in the thermoplastic resin.

The compound with the unit structure represented by the formula (11) includes for example known compounds with such unit structure. Without any limitation, any usable compounds may be selected. Specific examples of such compound are listed below. However, compounds usable in accordance with the invention are never limited to these specific examples. Additionally, hereinbelow, n, n' and n" represent an integer of 2 or more, below, while x and y represent an integer of 0 or more; a represents an integer of 0 or more; b represents an integer of 1 or more. Herein, the compounds listed below are compounds where the atom corresponding to the A in the formula (11) is oxygen atom. Similarly, compounds where the atom corresponding to the A is substituted with sulfur atom, are listed as well.

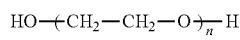

C-1

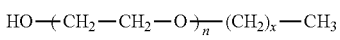

C-2

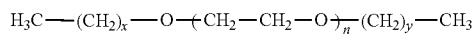

C-3

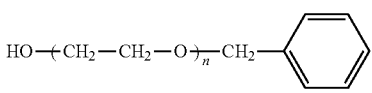

C-4

-continued
C-5 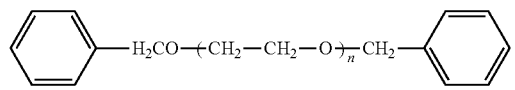
C-6 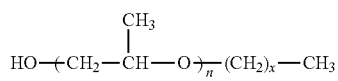
C-7 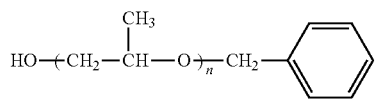
C-8 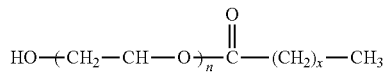
C-9 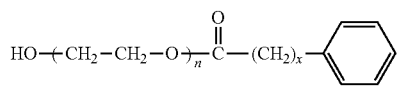
C-10 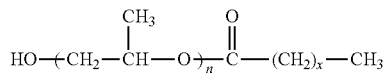
C-11 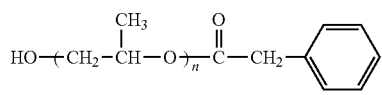
C-12
C-13
C-14
C-15
C-16
C-17
C-18
C-19 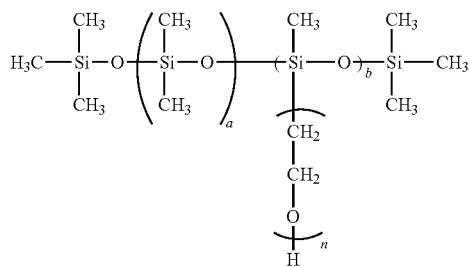
C-20
C-21 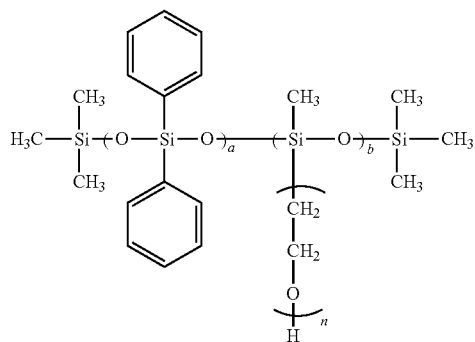
C-22 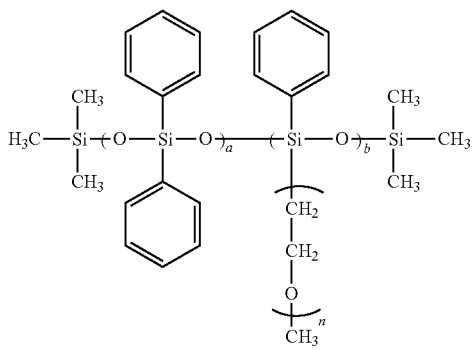

-continued

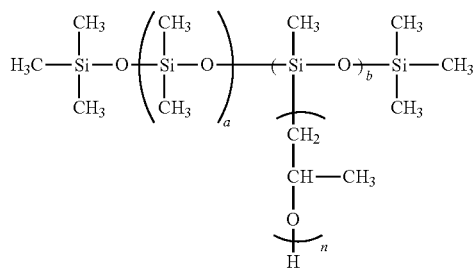
C-23

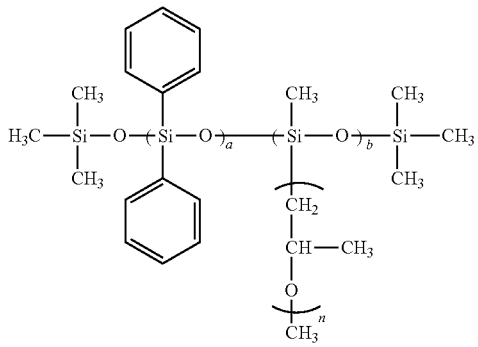
C-24

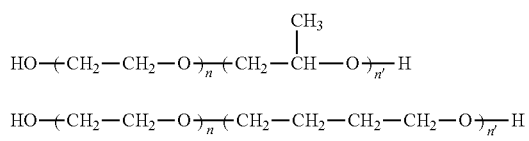
C-25

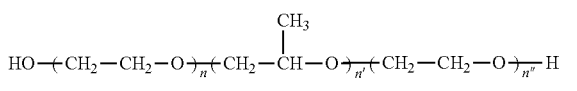
C-26

C-27

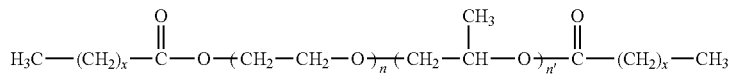

C-28

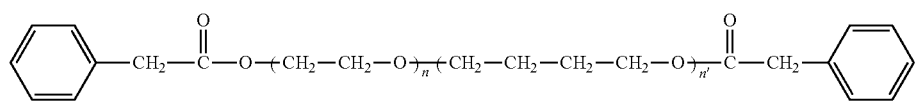

C-29

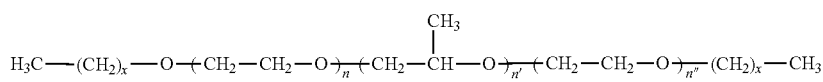

C-30

A compound with the unit structure represented by the formula (11) can be introduced into the thermoplastic resin by adding the compound to a polymer composing the thermoplastic resin or mixing the compound with the polymer. The method for adding the compound includes for example a method comprising dropwise adding the compound with the unit structure represented by the formula (11), singly or at a solution state, to a polymer solution, or a method comprising dropwise adding the compound with the unit structure represented by the formula (11) to a melt polymer during kneading.

The amount of the added compound with the unit structure represented by the formula (11) in the thermoplastic resin for use in accordance with the invention is preferably 0.01 to 15% by mass, more preferably 0.05 to 10% by mass, still more preferably 0.05 to 5% by mass.

A thermoplastic resin containing sulfur may also be used in accordance with the invention. Examples of polymers with a dithiane structure are those described in for example the individual official gazettes of JP-A-11-202101, JP-A-2002-131502, and JP-A-2005-29608. Additionally, examples of such resin with a urethane structure are those described in for example the individual official gazettes of JP-A-2001-342252 and JP-A-2001-106761. Examples of such resin with a phenylene sulfide structure are those described in JP-A-7-316295, JP-A-8-92367, JP-A-8-104751 and JP-A-8-100065.

Examples of resins with a refractive index of 1.65 or more other than those described above are those described in the individual official gazettes of JP-A-5-178929 and JP-A-2002-201262.

So as to improve the compatibility with inorganic fine particles, the resin for use in accordance with the invention has preferably a functional group selected from the group consisting of

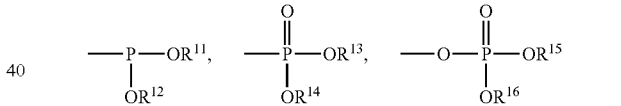

[wherein $R^{11}$ through $R^{16}$ independently represent hydrogen atom, a halogen atom or a substituted or unsubstituted alkyl group], $-SO_3H$, $-OSO_3H$, $-CO_2H$, $-OH$, and $-Si(OR^{17})_xR^{18}_{3-x}$, [wherein $R^{17}$ and $R^{18}$ independently represent hydrogen atom, a substituted or unsubstituted alkyl group, a substituted or unsubstituted alkenyl group, a substituted or unsubstituted alkynyl group, or a substituted or unsubstituted aryl group, and preferably represent hydrogen atom or a substituted or unsubstituted alkyl group; x represents an integer of 1 to 3, preferably 3].

More preferably, the resin has a functional group selected from

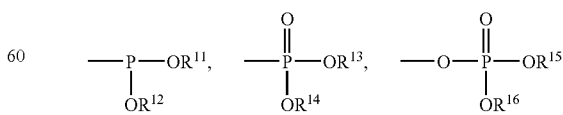

$-SO_3H$, $-OSO_3H$, $-CO_2H$, and $-Si(OR^{17})_xR^{18}_{3-x}$.

Still more preferably, the resin has a functional group selected from

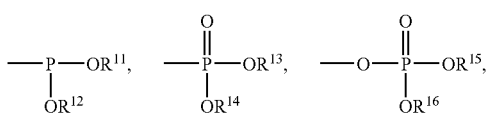

—SO$_3$H, —OSO$_3$H, and —CO$_2$H.

Additionally, more preferably, the resin has a functional group selected from

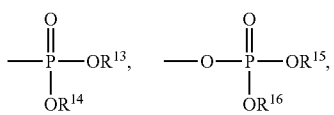

—SO$_3$H, and —CO$_2$H.

Particularly preferably, the resin has a functional group selected from

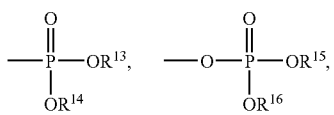

and —SO$_3$H. When these structural formulas may happen to form salts, the salts are also preferable.

The functional groups are preferably contained via a chemical bond in a polymer composing the thermoplastic resin. The sites where the functional groups are introduced are satisfactorily polymer ends, the main chains thereof or the side chains thereof. Further, the functional groups may satisfactorily be introduced in plural sites.

These functional groups are contained in the resin to preferably 0.1 to 20% by mass, more preferably 0.2 to 15% by mass, still more preferably 0.2 to 10% by mass. When the content thereof in the resin is 0.1% by mass or more, it works to readily improve the compatibility with inorganic fine particles. When the content thereof is 20% by mass or less, the thermoplasticity of an organic-inorganic hybrid composition prepared from the resin is likely to be retained readily.

The method for introducing the functional groups into the main chain or side chains of a polymer is not specifically limited. As the method, for example, there are listed methods comprising copolymerizing together monomers with such functional groups or methods comprising introducing the functional groups into the main chains or side chains of polymers via reaction.

The method for introducing functional groups into polymer ends includes for example a method comprising polymerization using an initiator, a terminator or a chain transfer agent with the functional groups to prepare the polymer, a method comprising modifying the phenol end of polycarbonate obtained from bisphenol A with a reaction agent containing the functional groups. For example, there are listed a radical polymerization of vinyl-series monomers by chain transfer methods using a sulfur-containing chain transfer agent, as described in New Polymer Experimentals 2, Polymer Synthesis and Reaction (1) Addition-series Polymer Synthesis (edited by Academic Polymer Association), Paragraph 110 to Paragraph 112; a living cation polymerization using a functional group-containing initiator and/or a functional group-containing terminator, as described in New Polymer Experimentals 2, Polymer Synthesis and Reaction (1) Addition-series Polymer Synthesis (edited by Academic Polymer Association), Paragraph 255 to Paragraph 256; and a ring-opening metathesis polymerization using a sulfur-containing chain transfer agent, as described in Macromolecules, Vol. 36, Paragraph 7020 to Paragraph 7026 (2003).

For producing the organic-inorganic hybrid composition of the invention, one type of the thermoplastic resin described above may singly be used. Otherwise, two types or more thereof may satisfactorily be mixed together for use. When two types or more thereof are mixed together for use, the resin composition after mixing preferably satisfies the condition about the refractive index described above.

Specific examples of the monomers for preferable use in producing the thermoplastic resin for use in accordance with the invention are listed below. The monomers for use in accordance with the invention are not limited to them. These monomers can be copolymerized with the monomers with the unit structure represented by the formula (11).

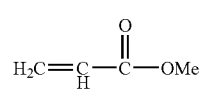
M-1

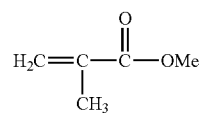
M-2

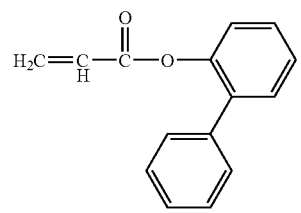
M-3

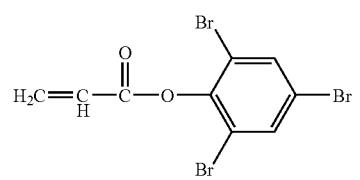
M-4

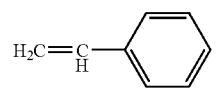
M-5

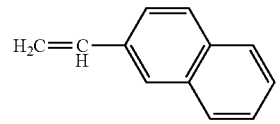
M-6

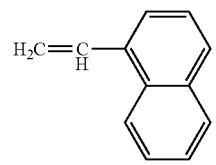
M-7

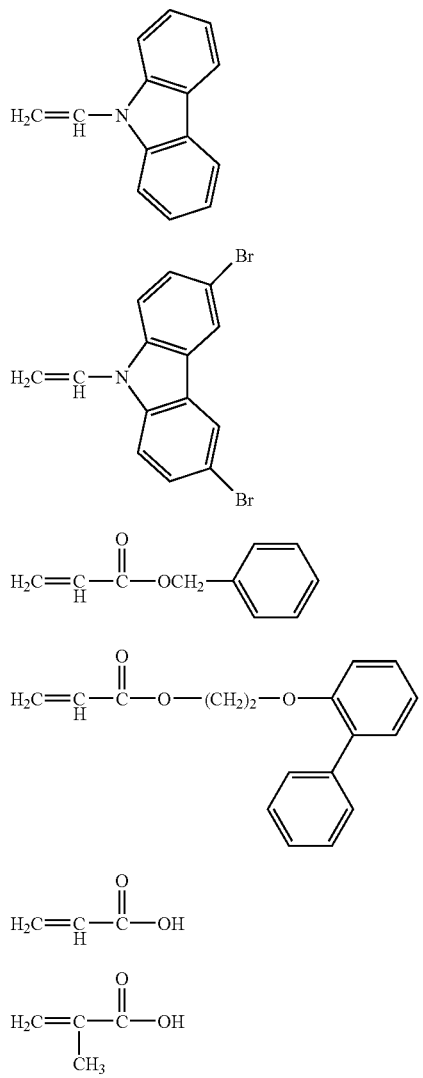

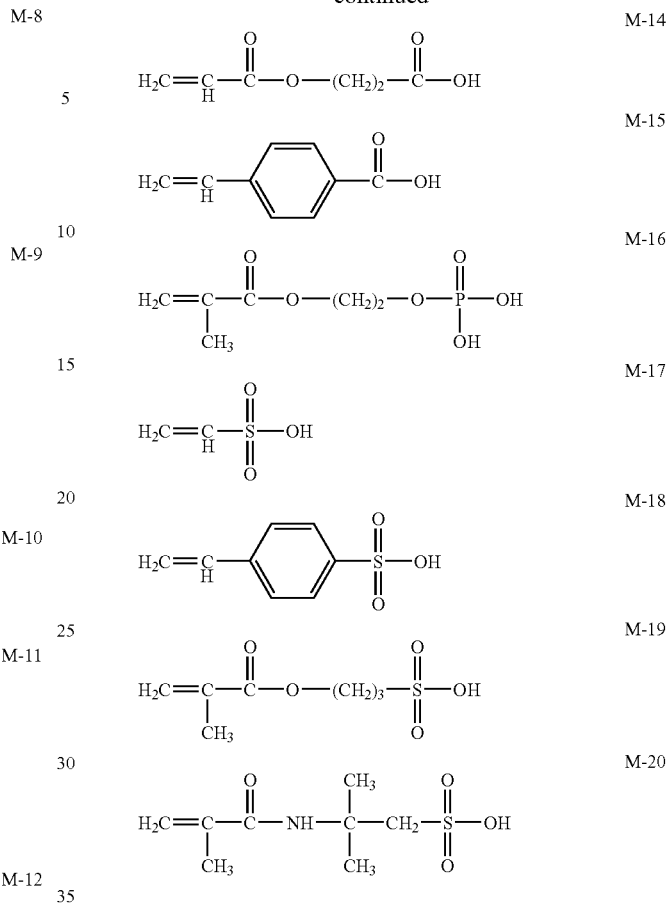

Preferable specific examples of the thermoplastic resin and the thermoplastic resin composition for use in accordance with the invention are listed as combinations of the structural monomers and initiators in the following Table. Nonetheless, the thermoplastic resin and the thermoplastic resin composition for use in accordance with the invention are not limited to these specific examples.

TABLE 1

| Name | Polymerization initiator | Monomer-1 | | Monomer-2 | | Monomer-3 | | Monomer-4 | | Additive 1 | | Additive 2 |
|---|---|---|---|---|---|---|---|---|---|---|---|---|
| Q-1 | V-601 | M-1 | (98.0) | M-12 | (1.0) | S-1 | (1.0) | | | | | |
| Q-2 | V-601 | M-1 | (45.0) | M-5 | (50.0) | M-13 | (3.0) | S-3 | (2.0) | | | |
| Q-3 | V-601 | M-2 | (97.0) | M-14 | (1.0) | S-5 | (2.0) | | | | | |
| Q-4 | V-601 | M-2 | (64.0) | M-6 | (30.0) | M-17 | (1.0) | S-11 | (5.0) | | | |
| Q-5 | V-601 | M-2 | (57.0) | M-8 | (40.0) | S-21 | (2.0) | S-37 | (1.0) | | | |
| Q-6 | V-601 | M-3 | (97.0) | M-14 | (1.0) | S-23 | (2.0) | | | | | |
| Q-7 | V-601 | M-3 | (97.0) | M-15 | (1.0) | | | | | C-1 | (2.0) | |
| Q-8 | V-601 | M-3 | (35.0) | M-5 | (60.0) | M-13 | (2.0) | S-10 | (3.0) | | | |
| Q-9 | V-601 | M-3 | (67.0) | M-8 | (30.0) | M-14 | (1.0) | S-26 | (2.0) | | | |
| Q-10 | V-601 | M-3 | (55.0) | M-11 | (40.0) | M-18 | (1.0) | S-16 | (4.0) | | | |
| Q-11 | A | M-5 | (98.0) | S-23 | (2.0) | | | | | | | |
| Q-12 | V-601 | M-5 | (95.0) | M-13 | (3.0) | S-5 | (2.0) | | | | | |
| Q-13 | V-601 | M-5 | (97.0) | M-14 | (1.0) | S-7 | (2.0) | | | | | |
| Q-14 | V-601 | M-5 | (98.0) | M-15 | (1.0) | S-26 | (1.0) | | | | | |
| Q-15 | V-601 | M-5 | (97.0) | S-31 | (2.0) | S-37 | (1.0) | | | | | |
| Q-16 | V-601 | M-5 | (98.0) | M-17 | (1.0) | S-35 | (1.0) | | | | | |
| Q-17 | V-601 | M-5 | (96.0) | M-14 | (1.0) | | | | | C-11 | (3.0) | |
| Q-18 | A | M-5 | (96.0) | | | | | | | C-5 | (4.0) | |
| Q-19 | A | M-5 | (97.0) | S-9 | (3.0) | | | | | | | |
| Q-20 | V-601 | M-5 | (73.0) | M-7 | (25.0) | M-14 | (1.0) | S-4 | (1.0) | | | |

TABLE 1-continued

| Name | Polymerization initiator | Monomer-1 | | Monomer-2 | | Monomer-3 | | Monomer-4 | | Additive 1 | | Additive 2 |
|---|---|---|---|---|---|---|---|---|---|---|---|---|
| Q-21 | V-601 | M-5 | (71.0) | M-8 | (25.0) | S-6 | (3.0) | S-36 | (1.0) | | | |
| Q-22 | V-601 | M-5 | (67.0) | M-10 | (30.0) | M-17 | (1.0) | S-2 | (2.0) | | | |
| Q-23 | V-601 | M-5 | (77.5) | M-11 | (20.0) | M-14 | (1.0) | S-23 | (0.5) | C-29 | (1.0) | |
| Q-24 | V-601 | M-6 | (93.0) | M-12 | (5.0) | S-9 | (2.0) | | | | | |
| Q-25 | V-601 | M-6 | (45.0) | M-10 | (50.0) | M-18 | (1.0) | S-17 | (4.0) | | | |
| Q-26 | V-601 | M-7 | (91.0) | M-19 | (1.0) | | | | | C-7 | (8.0) | |
| Q-27 | V-601 | M-7 | (68.0) | M-11 | (30.0) | M-16 | (1.0) | S-34 | (1.0) | | | |
| Q-28 | V-601 | M-8 | (96.0) | M-14 | (1.0) | | | | | C-1 | (2.0) | C-18 (1.0) |
| Q-29 | V-601 | M-8 | (66.0) | M-10 | (30.0) | M-13 | (2.0) | S-8 | (2.0) | | | |
| Q-30 | V-601 | M-8 | (58.0) | M-11 | (40.0) | M-18 | (1.0) | S-26 | (1.0) | | | |
| Q-31 | V-601 | M-10 | (97.0) | M-14 | (1.0) | S-23 | (2.0) | | | | | |
| Q-32 | V-601 | M-10 | (96.0) | M-17 | (1.0) | | | | | C-20 | (3.0) | |
| Q-33 | V-601 | M-11 | (97.0) | S-14 | (2.0) | S-37 | (1.0) | | | | | |
| Q-34 | V-601 | M-11 | (96.5) | M-20 | (1.5) | S-24 | (1.0) | | | C-30 | (1.0) | |
| Q-35 | A | M-2 | (99.0) | S-22 | (1.0) | | | | | | | |
| Q-36 | A | M-3 | (97.5) | S-15 | (2.0) | | | | | C-26 | (0.5) | |
| Q-37 | A | M-3 | (74.0) | M-10 | (25.0) | S-26 | (1.0) | | | | | |
| Q-38 | A | M-3 | (67.0) | M-11 | (30.0) | S-12 | (3.0) | | | | | |
| Q-39 | A | M-7 | (98.0) | S-35 | (2.0) | | | | | | | |
| Q-40 | A | M-10 | (98.5) | S-25 | (1.0) | | | | | C-21 | (0.5) | |

In Table 1, Polymerization Initiator V-601 represents dimethyl-2,2'-azobis(2-methylpropioante), manufactured by Wako Pure Chemicals Co., Ltd. Polymerization Initiator A represents the compound represented by the following formula; and when A was used, copper bromide as an auxiliary initiator was used.

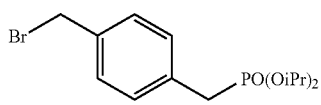

Initiator A

The thermoplastic resin represented by the formula (21) is now described below.

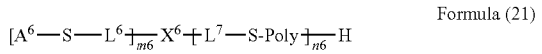

Formula (21)

In the formula (21), $A^6$ represents a substituent with a functional group capable of forming a chemical bond with the surface of inorganic fine particles; $L^6$ and $L^7$ independently represent a single bond or a divalent linker group; $X^6$ represents a linker group with a valence of (m6+n6); "Poly" means a polymer of vinyl monomers; m6 and n6 independently represent an integer of 1 to 10.

In the formula (21), $A^6$ represents a substituent capable of forming a chemical bond with the surface of inorganic fine particles. Herein, the term "chemical bond" includes for example covalent bonds, ionic bonds, coordination bonds and hydrogen bonds. When plural functional groups exist, satisfactorily, these plural functional groups individually may form different chemical bonds with inorganic fine particles. It is determined whether or not the functional groups may form chemical bonds, on the basis of the ability or inability of the functional groups in the thermoplastic resin to form a chemical bond with inorganic fine particles when the thermoplastic resin and inorganic fine particles are mixed together in an organic solvent, as described in the following Examples. In the organic-inorganic hybrid composition of the invention, satisfactorily, all the functional groups in the thermoplastic resin may form chemical bonds with inorganic fine particles or a part of the functional groups may form chemical bonds with inorganic fine particles.

The functional groups capable of forming chemical bonds with inorganic fine particles may be in any structure with no specific limitation, provided that the functional groups are capable of forming chemical bonds with inorganic fine particles. Specific examples thereof are preferably functional groups selected from the group consisting of

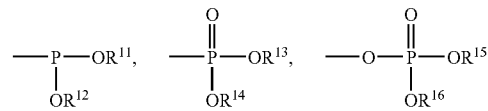

$-SO_3H$, $-OSO_3H$, $-CO_2H$, and $-Si(OR^{17})_xR^{18}_{3-x}$. Additionally, the preferable ranges thereof are as described above.

The substituent $A^6$ includes for example the following structures.

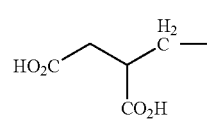

A-1

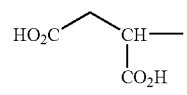

A-2

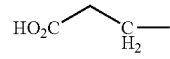

A-3

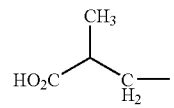

A-4

-continued

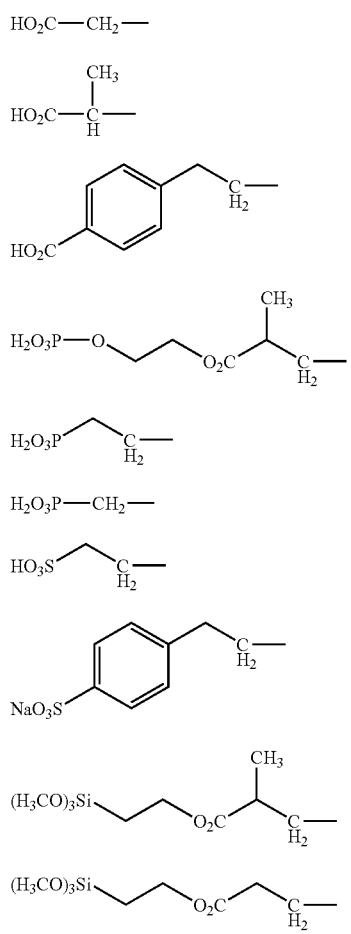

A-5
A-6
A-7
A-8
A-9
A-10
A-11
A-12
A-13
A-14

-continued

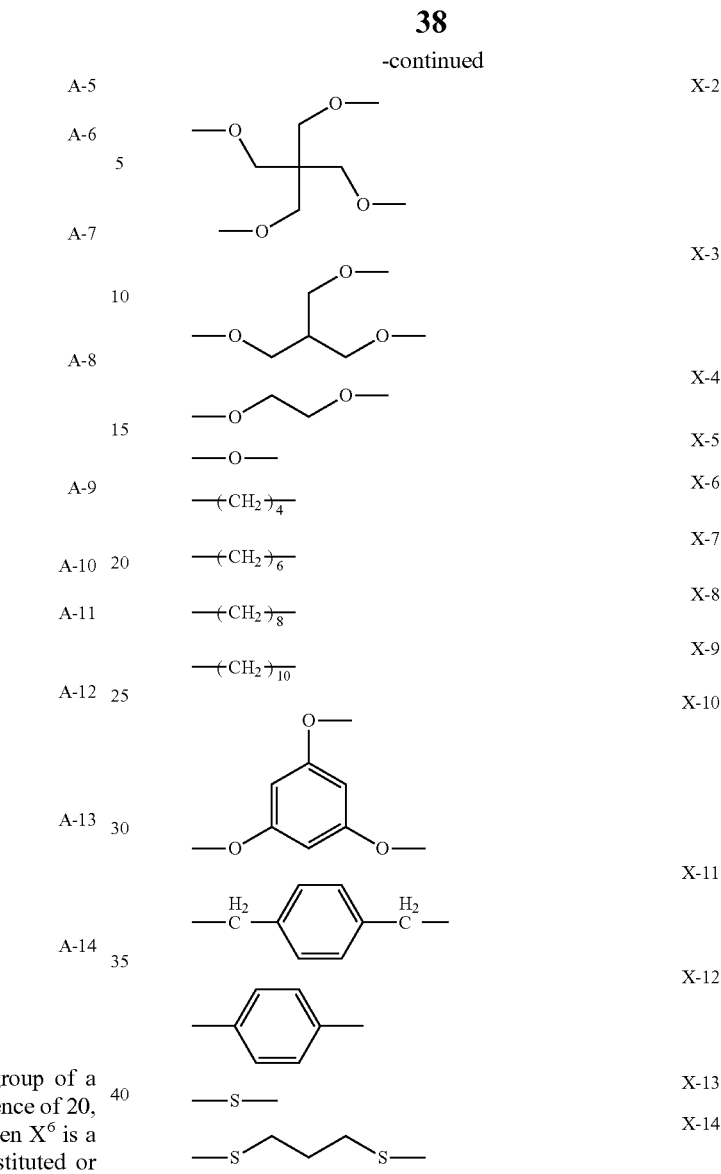

X-2
X-3
X-4
X-5
X-6
X-7
X-8
X-9
X-10
X-11
X-12
X-13
X-14

In the formula (21), $X^6$ represents a linker group of a valence of (m6+n6), preferably divalence to a valence of 20, more preferably divalence to a valence of 10. When $X^6$ is a divalent linker group, for example, $X^6$ is a substituted or unsubstituted alkylene group, ether group, a substituted or unsubstituted arylene group, or a linker group prepared by linking together two or more thereof. The carbon atoms in the alkylene group are preferably one to 20, more preferably one to 10, and still more preferably one to 5. The carbon atoms in the arylene group are preferably 6 to 20, more preferably 6 to 12. The substituent for the alkylene group and the arylene group includes for example alkyl groups and aryl groups.

When $X^6$ is a linker group of a valence of 3 or more, for example, the divalent linker groups with an additional branched structure at any aromatic ring or non-aromatic carbon atom therein are exemplified. Specific examples of $X^6$ include the following structures. The linker group selectable as $X^6$ in the formula (21) is not limited to them.

In the formula (21), $L^6$ and $L^7$ independently represent a single bond binding together $X^6$ and sulfur atom or a divalent linker group binding together X and sulfur atom. The divalent linker group includes for example a substituted or unsubstituted alkylene group, carbonyl group, a substituted or unsubstituted imino group, or a linker group prepared by conjugating two or more thereof together. The carbon atoms in the alkylene group are preferably one to 20, more preferably one to 10 and still more preferably one to 5. The substituent for the alkylene group and the imino group includes alkyl groups. Specific examples of the divalent linker groups include the following structures, but the linker groups selectable as $L^6$ and $L^7$ in the formula (21) are not limited to them.

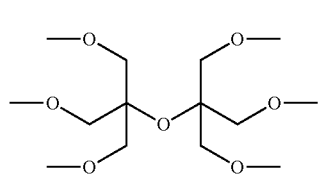

X-1

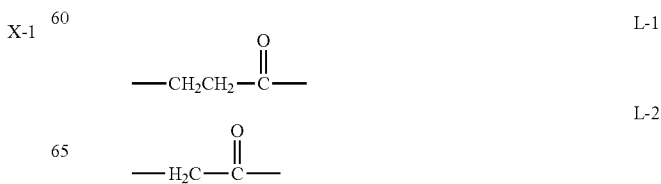

L-1
L-2

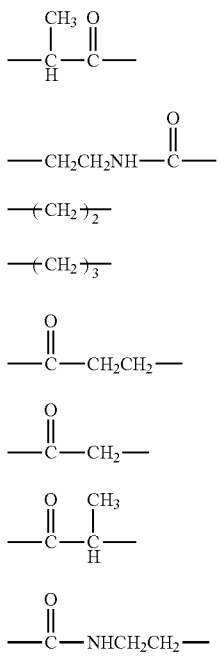

L-3

L-4

L-5

L-6

L-7

L-8

L-9

L-10

In the formula (21), "Poly" represents a polymer of vinyl monomers. The vinyl monomer includes for example those described in Polymer Handbook, the 2nd ed., J. Brandrup, Wiley Interscience (1975), Chapter 2, Page 1 to 483. Specifically, the vinyl monomer includes for example compounds with one addition-polymerizable unsaturated bond, which are selected from styrene derivatives, 1-vinylnaphthalene, 2-vinylnaphthalene, vinylcarbazol, acrylate esters, methacrylate esters, acrylamides, methacrylamides, allyl compounds, vinyl ethers, vinyl esters, dialkyl itaconates, and dialkyl esters or monoalkyl esters of fumaric acid.

The styrene derivatives include for example styrene, 2,4,6-tribromostyrene and 2-phenylstyrene.

The acrylate esters include for example methyl acrylate, ethyl acrylate, propyl acrylate, n-butyl acrylate, tert-butyl acrylate, chloroethyl acrylate, 2-hydroxyethyl acrylate, trimethylolpropane monoacrylate, benzyl acrylate, benzyl methacrylate, methoxybenzyl acrylate, furfuryl acrylate, tetrahydrofuryl acrylate and 2-phenylphenyl acrylate.

The methacrylate esters include for example methyl methacrylate, ethyl methacrylate, propyl methacrylate, butyl methacrylate, tert-butyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, and 2-phenylphenyl methacrylate.

The acrylamides include for example acrylamide, N-alkyl acrylamide (where the alkyl group is with one to 3 carbon atoms, for example methyl group, ethyl group and propyl group), N,N-dialkyl acrylamide (where the alkyl group is with one to carbon atoms), N-hydroxyethyl-N-methyl acrylamide, and N-2-acetamideethyl-N-acetyl acrylamide.

The methacrylamides include for example methacrylamide, N-alkyl methacrylamide (where the alkyl group is with one to 3 carbon atoms, for example methyl group, ethyl group and propyl group), N,N-dialkyl methacrylamide (where the alkyl group is with one to 6 carbon atoms), N-hydroxyethyl-N-methyl methacrylamide, and N-2-acetamideethyl-N-acetyl methacrylamide.

The allyl compounds include for example allyl esters (for example, allyl acetate, allyl caproate, allyl caprylate, allyl laurate, allyl palmitate, allyl stearate, allyl benzoate, allyl acetoacetate, and allyl lactate), and allyl oxyethanol.

The vinyl ethers include for example alkyl vinyl ether (where the alkyl group is with one to 10 carbon atoms, for example hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether.

The vinyl esters include for example vinyl butylate, vinyl isobutylate, vinyl trimethyl acetate, vinyl diethyl acetate, vinyl valate, vinyl caproate, vinyl chloroacetate, vinyl dichloroacetate, vinyl methoxyacetate, vinyl butoxyacetate, vinyl lactate, vinyl-β-phenyl butylate, and vinylcyclohexyl carboxylate.

The dialkyl itaconates include for example dimethyl itaconate, diethyl itaconate, and dibutyl itaconate. The dialkyl esters or monoalkyl esters of fumaric acid include for example dibutyl fumarate.

In addition, acrylonitrile, methacrylonitrile, maleironitrile, and maleimide (N-methylmaleimide, N-phenylmaleimide) are also included.

The polymer of vinyl monomers as represented as "Poly" is preferably a polymer of acrylate or methacrylate.

The polymer of vinyl monomers as represented as "Poly" is satisfactorily a homopolymer or a copolymer comprising two types or more of such monomers.

Specific examples of Poly include for example the following structures. Groups selectable as Poly of the formula (21) are not limited to them. The structure in [ ] represents a repeat unit, while the numerical figures attached to the repeat units represent the copolymerization ratios (in molar ratios).

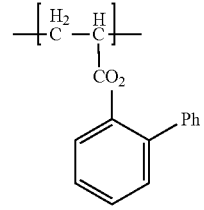

R-1

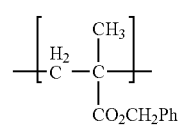

R-2

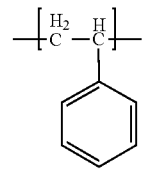

R-3

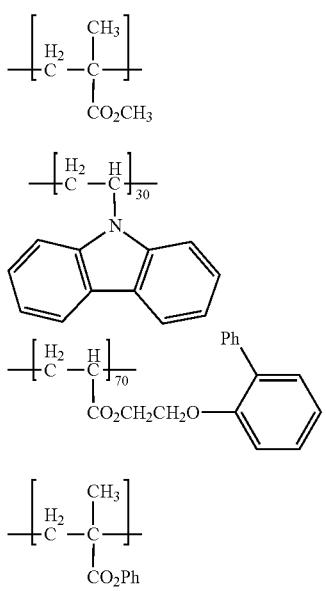

R-4

R-5

R-6

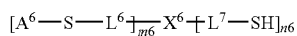

Formula (22)

In the formula (2), $A^6$, $L^6$, $L^7$, $X^6$, Poly, m6, and n6 have the same meanings as in the formula (21).

The thiol derivative represented by the formula (2) can readily be prepared synthetically by known methods such as nucleophilic substitution-, nucleophilic addition-, and radical addition reactions of polyvalent thiol compounds. The thiol derivative may be isolated and purified by means of chromatography for use in the following processes or the thiol derivative may be used as a reaction mixture as it is for use in the following processes. Herein, m6 and n6 of the reaction mixture would be average values of the mixture, which can be readily determined by $^1$H NMR.

Specific preferable examples of the thermoplastic resin for use in accordance with the invention are listed below (exemplified compounds J-1 through J-13). The thermoplastic resin for use in accordance with the invention is never limited to them.

TABLE 2

| Exemplified compound | $A^6$ | $X^6$ | $L^6$ | $L^7$ | m6 | n6 | Poly | Number average molecular weight |
|---|---|---|---|---|---|---|---|---|
| J-1 | A-1 | X-1 | L-1 | L-7 | 5 | 1 | R-1 | 36,800 |
| J-2 | A-1 | X-1 | L-1 | L-7 | 4 | 2 | R-1 | 38,300 |
| J-3 | A-8 | X-4 | L-2 | L-8 | 1 | 1 | R-1 | 24,600 |
| J-4 | A-4 | X-2 | L-3 | L-9 | 3 | 1 | R-3 | 35,500 |
| J-5 | A-1 | X-1 | L-1 | L-7 | 5 | 1 | R-2 | 29,100 |
| J-6 | A-9 | X-4 | L-5 | L-5 | 1 | 1 | R-1 | 28,300 |
| J-7 | A-13 | X-3 | L-1 | L-7 | 2 | 1 | R-6 | 33,700 |
| J-8 | A-11 | X-11 | Single bond | Single bond | 1 | 1 | R-2 | 22,800 |
| J-9 | A-8 | X-9 | L-2 | L-8 | 1 | 1 | R-5 | 40,200 |
| J-10 | A-1 | X-2 | L-2 | L-8 | 3 | 1 | R-5 | 31,300 |
| J-11 | A-5 | X-1 | L-1 | L-7 | 3 | 3 | R-4 | 29,500 |
| J-12 | A-10 | X-13 | L-4 | L-10 | 1 | 1 | R-2 | 34,200 |
| J-13 | A-1 | X-1 | L-1 | L-7 | 5 | 1 | R-6 | 37,800 |

In the formula (21), m6 represents an integer of 1 to 10, preferably 1 to 5. n6 represents an integer of 1 to 10, preferably 1 to 5. The relation in size between m6 and n6 is preferably expressed as m6≤n6.

In the formula (21), As in the number of m6 may be the same or different from each other and $L^1$s in the number of m6 may be the same or different from each other, when m6 is 2 or more. When n6 is 2 or more, $L^2$s in the number of n6 may be the same or different from each other, while Polys in the number of n6 may be the same or different from each other. Preferably, these are individually the same.

The thermoplastic resin represented by the formula (21) can be synthetically prepared via a radical polymerization in the co-presence of a thiol derivative represented by the following formula (22) and a vinyl monomer, as described in for example New Polymer Experimentals 4, Polymer Synthesis and Reaction (1) Addition-series Polymer Synthesis (edited by Academic Polymer Association), Section 1, Paragraph 109 to Paragraph 112.

These thermoplastic resins may be used singly or two types or more of the thermoplastic resins may be mixed together for use. Additionally, these thermoplastic resins may contain other copolymerizable components. Further, the thermoplastic resin may be mixed with a resin without the structure of the formula (21), for use. The type of such resin is not limited specifically. Preferably, the type of such resin satisfies the optical physico-chemical properties, thermal physico-chemical properties and molecular weight as described above.

[Inorganic Fine Particles]

The inorganic fine particles for use in accordance with the invention include for example oxide particles, sulfide fine particles, selenide fine particles, and tellurium fine particles. More specifically, the inorganic fine particles include for example titanium oxide fine particles, zinc oxide fine particles, zirconium oxide fine particles, tin oxide fine particles, cerium oxide fine particles, zinc sulfide fine particles, and barium titanate fine particles. Preferably, the inorganic fine particles are titanium oxide fine particles, zirconium oxide fine particles, zinc sulfide fine particles, and barium titanate fine particles. More preferably, the inorganic fine particles are fine particles containing titanium oxide and/or zirconium oxide. Herein, the inorganic fine particles for use in accordance with the invention are not limited to the materials listed herein.

In accordance with the invention, one type of inorganic fine particles may be used singly or plural types of inorganic fine particles may be used in combination. From the respect of refractive index, transparency and stability, the inorganic fine particles may be used as a hybrid of these inorganic matters. For the purpose of reducing the activity of an optical catalyst or reducing the water absorption ratio, additionally, these fine particles may be doped with elements of another species, or the surface layer thereof may be coated with metal oxides of different species, such as silica and alumina, or may be fine particles surface-modified with silane coupling agents and titanate coupling agents. The element of a different species for use in such doping includes for example barium, cobalt and yttrium.

The method for producing the inorganic fine particles for use in accordance with the invention is not specifically limited. As the method, any known methods may be used. Using metal halides and alkoxy metals as raw materials, for example, hydrolysis in a reaction system containing water is done to obtain desired oxide fine particles.

Specifically, titanyl sulfate is used as a raw material for synthetically preparing titanium oxide nano-particles, while zinc salts such as zinc acetate and zinc nitrate are exemplified as raw materials for synthetically preparing zinc oxide nano-particles. Metal alkoxides such as tetraethoxysilane and titanium tetraisopropoxide are also preferable as raw materials for the inorganic fine particles. The method for synthetically preparing such inorganic fine particles includes for example a method described in the Japanese Journal of Applied Physics, Vol. 37, pp. 4603-4608 (1998) or Langmuir Vol. 16, No. 1, pp. 241-246 (2000). Additionally, the method described in JP-A-2006-16236 comprising adding a basic solution to a metal salt solution for partial neutralization, then adding an inorganic salt to the resulting solution to prepare a mixture solution, and heating the mixture solution, can be used to prepare a metal particle.

In case that oxide nano-particles are synthetically prepared by a sol generation method, in particular, a procedure en route a precursor such as hydroxide as in the case of the synthesis of titanium oxide nano-particles using titanyl sulfate as a raw material, followed by dehydration condensation or defloculation due to acid and alkali to prepare a hydrosol may also be possible. By the procedure en route such precursor, preferably, the precursor is isolated or purified by an appropriate process such as filtration or centrifugation in view of the purity of the final product. Adding an appropriate surfactant such as sodium dodecylbenzene sulfonate (DBS as the abbreviation), and dialkylsulfosuccinate monosodium salt ("Eleminol JS-2" under trade name as manufactured by Sanyo Chemical Industries, Ltd.) to the resulting hydrosol, the sol particles are modified as a non-aqueous preparation, for isolation. For example, known methods described in "Coloring Materials (Shokuzai)", Vol. 57, No. 6, pp. 305-308 (1984) may also be used.

Additionally, a method for preparing inorganic fine particles in an organic solvent is also included in the methods, other than the method comprising hydrolysis in water. Then, the thermoplastic resin for use in accordance with the invention may satisfactorily be dissolved in the organic solvent.

The solvent for use by these methods includes for example acetone, 2-butanone, dichloromethane, chloroform, toluene, ethyl acetate, cyclohexanone, and anisole. These may be used singly as one type, or plural types thereof may be mixed together for use.

When the number average particle size of the inorganic fine particles for use in accordance with the invention is too small, the characteristic profiles specific to substances composing the fine particles may sometimes be modified. When the number average particle size is too large, the influence of Rayleigh scattering is marked so that the transparency of the organic-inorganic hybrid composition may sometimes be reduced extremely. Therefore, the lower limit of the number average particle size of the inorganic fine particles for use in accordance with the invention is preferably 1 nm or more, more preferably 2 nm or more, still more preferably 3 nm or more. The upper limit thereof is preferably 15 nm or less, more preferably 10 nm or less, still more preferably 5 nm or less. Specifically, the number average particle size of the inorganic fine particles in accordance with the invention is preferably 1 nm to 15 nm, more preferably 2 nm to 13 nm, still more preferably 2 nm to 10 nm, further more preferably 3 nm to 10 nm, and particularly preferably 3 nm to 5 nm.

Herein, the number average particle size described above can be measured by X-ray diffraction (XRD) or with a transmission electron microscope (TEM).

The range of the refractive indices of the inorganic fine particles for use in accordance with the invention at a wavelength of 589 nm at 22° C. is preferably 1.90 or more, more preferably 1.90 to 3.00, still more preferably 1.90 to 2.70, and furthermore preferably 2.00 to 2.70. When the refractive index of the inorganic fine particles in accordance with the invention is 1.90 or more, an organic-inorganic hybrid composition with a refractive index larger than 1.70 (preferably, 1.75, more preferably 1.80) is more readily produced. When the refractive index is 3.00 or less, an organic-inorganic hybrid composition with a transmission ratio of 80% or more is readily produced.

The refractive index of inorganic fine particles can be estimated by a method comprising first preparing a hybrid of the thermoplastic resin for use in accordance with the invention into a transparent film, then measuring the refractive index of the resulting film with Abbe refractometer (for example, "DM-M4" manufactured by Atago Co., Ltd.), and then calculating the refractive index of the inorganic fine particles on the basis of the refractive index of a resin component alone as measured separately, or by a method comprising measuring the refractive indices of particle dispersions at different concentrations and then calculating the refractive index of the inorganic fine particles.

The content of the inorganic fine particles in the organic-inorganic hybrid composition of the invention is preferably 1 to 95% by weight, more preferably 5 to 95% by weight. From the standpoints of transparency and preparing large refractive indices, the content is preferably 20 to 95% by mass, more preferably 25 to 70% by mass and particularly preferably 30 to 60% by mass. The mass ratio of the inorganic fine particles and the thermoplastic resin (dispersion polymer) in accordance with the invention is preferably 1:0.01 to 1:100, more preferably 1:0.05 to 1:10, and particularly preferably 1:0.05 to 1:5.

[Additives]

Other than the thermoplastic resin and the inorganic fine particles, various additives may appropriately be blended in the organic-inorganic hybrid composition of the invention in view of the adjustment of uniform dispersibility, fluidity and releasability during molding and weatherability.

The ratio of these blended additives varies depending on the purpose. To the total amount of the inorganic fine particles and the thermoplastic resin, the ratio is preferably 0 to 50% by mass, more preferably 0 to 30% by mass and particularly preferably 0 to 20% by mass.

[Surface-Treating Agents]

In accordance with the invention, agents for modifying the surface of the inorganic fine particles except the thermoplastic resin may be added in mixing the inorganic fine particles dispersed in water or an alcohol solvent with the thermoplastic resin, as described below, for various purposes such as for the purpose of raising the extractability or substitution property in an organic solvent, the purpose of raising the uniform dispersibility in the thermoplastic resin, the purpose of reducing the water absorption of the fine particles, or the purpose of raising the weatherability. The weight average molecular weight of the surface-treating agent is preferably 50 to 50,000, more preferably 100 to 20,000, still more preferably 200 to 10,000.

The surface-treating agent is preferably in the structure represented by the following formula (3).

A-B               Formula (3)

In the formula (3), A represents a functional group capable of forming a chemical bond with the surface of the inorganic fine particles for use in accordance with the invention; and B represents a monovalent group with one to 30 carbon atoms or a polymer, having compatibility or reactivity with the resin matrix comprising the thermoplastic resin as the main component. Herein, the term chemical bond means for example covalent bonds, ionic bonds, coordination bonds and hydrogen bonds.

Specific examples of A in coordination with the inorganic fine particles include sulfur-containing organic compounds such as thiol and sulfonates, phosphorus-containing organic ligands including phosphine and phosphine oxide, phosphonic acid and phosphate esters, nitrogen-containing ligands containing alkyl amine and aromatic amine, and ligands containing carboxylates are effective. Among those exemplified above, phosphorus-containing ligands are preferably used and preferably include for example KAYAMER PM-21 manufactured by Nippon Kayaku Co., Ltd. and dibenzyl phosphate, and diphenyl phosphate. As specific examples of A for modification via covalent bond, metal alkoxides as the active functional groups in silane-coupling agents, titanate-series coupling agents and aluminium-series coupling agents for use in the related art for oxide surface treatment, such as silica, alumina and titania (titanium oxide), are effective. Among them, silane-coupling agents are preferable, for which methods described in JP-A-5-221640, JP-A-9-100111, and JP-A-2002-187921 may be used. Furthermore, preferable examples of the group represented by A are those listed as the functional groups for the thermoplastic resin for use in accordance with the invention.

Alternatively, the chemical structure of the group represented by B is preferably the same as or similar to the chemical structure of the thermoplastic resin as the main body of the resin matrix, from the standpoint of compatibility. In accordance with the invention, preferably, the chemical structure of B as well as the thermoplastic resin may contain an aromatic ring, so as to allow a large refractive index.

Examples of the surface-treating agent for use preferably in accordance with the invention include p-octylbenzoic acid, p-propylbenzoic acid, acetic acid, propionic acid, cyclopentanecarboxylic acid, dibenzyl phosphate, monobenzyl phosphate, diphenyl phosphate, di-α-naphthyl phosphate, phenylphosphonic acid, phenylphosphonate monophenyl ester, KAYAMER PM-21 (under trade name; manufactured by Nippon Kayaku Co., Ltd.), KAYAMER PM-2 (under trade name; manufactured by Nippon Kayaku Co., Ltd), benzenesulfonic acid, naphthalenesulfonic acid, p-octylbenzenesulfonic acid, or silane coupling agents described in JP-A-5-221640, JP-A-9-100111, and JP-A-2002-187921, with no specific limitation These surface-treating agents may be used singly as one type or plural types thereof may be used in combination.

The total amount of these surface-treating agents added is preferably 0.01- to 2-fold, more preferably 0.03- to one-fold, particularly preferably 0.05- to 0.5-fold that of the inorganic fine particles.

[Plasticizers]

When the glass transition temperature of the thermoplastic resin for use in accordance with the invention is high, the molding of the composition is not always readily done. Therefore, a plasticizer may satisfactorily be used to lower the molding temperature of the composition of the invention. The amount of the plasticizer when added is preferably 1 to 50% by mass, more preferably 2 to 30% by mass, particularly preferably 3 to 20% by mass of the total amount of the organic-inorganic hybrid composition.

The plasticizer for use in accordance with the invention should be determined, generally in light of the compatibility with the resin, weatherability and plasticizing effect. The optimum material depends on the other compositions. The plasticizer for use in accordance with the invention is not specifically limited but includes known plasticizers such as dicarboxylate ester derivatives (dioctyl phthalate, diphenyl phthalate, dioctyl adipate), phosphate ester derivatives (tricresyl phosphate, Reofos RDP (manufactured by Ajinomoto Fine-Techno Co., Inc.), Reofos BAPP (manufactured by Ajinomoto Fine-Techno Co., Inc.), and acryl-series polymeric plasticizers (ARUFON UP-1010 (manufactured by To a Gosei, Co., Ltd.). From the respect of refractive index, plasticizers with an aromatic ring may preferably be used. Typical examples thereof are plasticizers with the structure represented by the following formula (5).

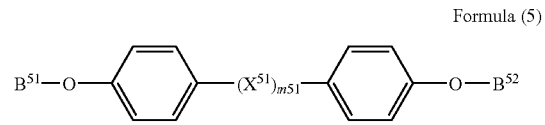

Formula (5)

(wherein, $B^{51}$ and $B^{52}$ represent an alkyl group with 6 to 18 carbon atoms or an arylalkyl group with 6 to 18 carbon atoms; m51 represents 0 or 1; $X^{51}$ is any one of

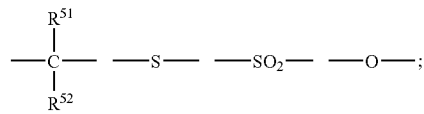

$R^{51}$ and $R^{52}$ independently represent hydrogen atom or an alkyl group with 4 or less carbon atoms.)

In the compound represented by (5), an appropriate alkyl group or arylalkyl group within a range of 6 to 18 carbon atoms may be selected as $B^{51}$, and $B^{52}$. When the carbon atoms are less than 6, the molecular weight is too small, so that the compound boils at the melt temperature of the polymer, sometimes generating gas bubble. When the carbon atoms are more than 18, the compatibility with the polymer is deteriorated so that the addition effect is insufficient.

The $B^{51}$ and $B^{52}$ specifically includes for example linear alkyl groups such as n-hexyl group, n-octyl group, n-decyl group, n-dodecyl group, n-tetradecyl group, n-hexadecyl group and n-octadecyl group, branched alkyl groups such as 2-hexyldecyl group and methyl-branched octadecyl group or arylalkyl groups such as benzyl group and 2-phenylethyl group. Additionally, specific examples of the compound represented by the formula (5) are those described below. Specifically, W-1 (KP-L155 under the trade name, as manufactured by Kao Corporation) is preferable.

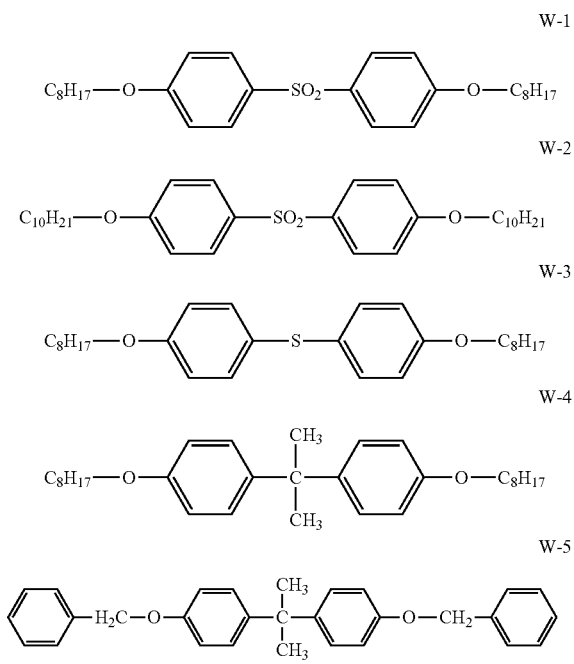

<Other Additives>

Other than the components above, known release agents such as modified silicone oil may be added for the purpose of improving the moldability. For the purpose of improving the weatherability and the thermal deterioration, known deterioration-preventing agents of hindered phenol-series, amine-series, phosphorus-series, and thioether-series may appropriately be added. In case of blending them, they are preferably at about 0.1 to 5% by mass of the total solid content of the organic-inorganic hybrid composition.

[Method for Producing the Organic-Inorganic Hybrid Composition]

The organic-inorganic hybrid composition of the invention can be produced by dispersing the inorganic fine particles in the thermoplastic resin.

The detail of the method for producing the organic-inorganic hybrid composition is not specifically limited. Specifically, there are listed a method for independently preparing synthetically the resin and the inorganic fine particles, and then mixing together the two products, a method for preparing the resin synthetically in the presence of the preliminarily prepared inorganic fine particles, a method for synthetically preparing the inorganic fine particles in the presence of the preliminarily prepared resin, a method for synthetically preparing both the resin and the inorganic fine particles simultaneously. Any one of the methods may be used for the preparation. When the method for independently preparing the resin and the inorganic fine particles synthetically and then mixing the resulting two products together is selected, the inorganic fine particles may be mixed with a solution of the resin under agitation, or a dispersion solution of the inorganic fine particles may be mixed with a solution of the resin under agitation. Then, the inorganic fine particles or the dispersion solution may instantly be mixed with a solution of the resin or gradually be added in a dropwise manner to a solution of the resin. For mixing under agitation, further, the presence of a plasticizer or a dispersant may be satisfactory. Such plasticizer and dispersant may preliminarily be added to a solution of the resin or a dispersion of the inorganic fine particles. Otherwise, these may be added to a mixture of a solution of the resin and the inorganic fine particles.

The particle size of the inorganic fine particles for preferable use in accordance with the invention is so small and has such large surface energy that the inorganic fine particles when isolated in a solid may sometimes be dispersed again with much difficulty. Therefore, the inorganic fine particles preferably at a state of dispersion in a solution may be mixed with the thermoplastic resin to prepare a stable dispersion. The preferable method for producing the hybrid includes (1) a method comprising surface treatment of the inorganic fine particles in the presence of the surface-treating agent, extracting the surface-treated inorganic fine particles in an organic solvent, uniformly mixing the extracted inorganic fine particles with the thermoplastic resin to prepare a hybrid of the inorganic fine particles with the thermoplastic resin, and (2) a method comprising uniformly mixing together both the inorganic fine particles and the thermoplastic resin using a solvent capable of uniformly dispersing or dissolving both of them, to prepare a hybrid of the inorganic fine particles with the thermoplastic resin.

In case that a hybrid of the inorganic fine particles with the thermoplastic resin is to be produced by the method (1), non-aqueous solvents such as toluene, ethyl acetate, methyl isobutyl ketone, chloroform, dichloroethane, dichloroethane, chlorobenzene, and methoxybenzene are used as organic solvents. The surface-treating agent for use in the extraction of the fine particles into an organic solvent may be the same type as the thermoplastic resin or a different type from the type of the thermoplastic resin. As the surface-treating agent for preferable use, those described in the column <Surface-treating agent> may be used.

In mixing the inorganic fine particles extracted into an organic solvent with the thermoplastic resin, an additive such as a plasticizer, a release agent or a different type of polymers may be added, if necessary.

When the method (2) is selected, hydrophilic polar solvents such as dimethylacetamide, dimethylformamide, dimethylsulfoxide, benzyl alcohol, cyclohexanol, ethylene glycol monomethyl ether, 1-methoxy-2-propanol, tert-butanol, acetic acid and propionic acid are used singly as solvents, or mixture solvents thereof may also be used. Otherwise, mixture solvents of non-aqueous solvents such as chloroform, dichloroethane, dichloromethane, ethyl acetate, methyl ethyl ketone, methyl isobutyl ketone, toluene, chlorobenzene and methoxybenzene and the polar solvents described above are preferably used. Then, dispersants, plasticizers, release agents or polymers of a different type may be added if necessary, besides the thermoplastic resin described above. When the fine particles dispersed in water/methanol are used, a hydrophilic solvent with a higher boiling point than those of water/methanol and with an ability of dissolving the thermoplastic resin is added, followed by concentration and distillation of water/methanol, to substitute the dispersion solution of the fine particles with the polar organic solvent, which is then mixed with the resin, preferably. Then, the surface-treating agent may be added, satisfactorily.

The solution of the organic-inorganic hybrid composition as obtained by the methods (1) and (2) may be cast-molded to be prepared into a molded article, as it is. In accordance with the invention, in particular, the solution is removed by procedures such as concentration, freeze-drying, or re-precipitation from an appropriate poor solvent. Subsequently, the resulting solid in powder is molded preferably by procedures such as injection molding or compression molding.

[Molded Articles]

By molding the organic-inorganic hybrid composition of the invention, the molded article of the invention can be produced. The molded article of the invention has the refractive index and the optical properties as described in the column about the organic-inorganic hybrid composition, and is therefore useful. In particular, a molded article with an optical transmission ratio of 70% or more at a wavelength of 589 nm on a 1-mm thickness basis and with a refractive index of 1.63 or more is useful.

The maximum thickness of the molded article in accordance with the invention is preferably 0.1 mm or more. The maximum thickness is preferably 0.1 to 5 mm, more preferably 1 to 3 mm. Molded articles of such thickness are useful particularly as optical parts with large refractive indices. Molded articles of such thickness are generally produced, with much difficulty, by solution cast methods, because the solvent therein can hardly be drawn out. When the organic-inorganic hybrid composition of the invention is used, however, molding is readily done to readily prepare complicated shapes such as non-spherical shapes. As described above, in accordance with the invention, molded articles with good transparency can be obtained, using the large refractive index properties of the fine particles.

[Optical Parts]

The molded article in accordance with the invention having excellent refraction properties, optical transmission properties and lightweight properties is a molded article with great optical properties. The optical parts of the invention comprise such molded article. The type of the optical parts of the invention is not specifically limited. The molded article is preferably used, particularly as optical parts utilizing the great optical properties of the organic-inorganic hybrid composition, particularly as optical parts with optical transmission (so-called passive optical parts). Optically functional apparatuses with such optical parts include for example various display apparatuses (liquid-crystal display, plasma display, etc.), various projector apparatuses (OHP, liquid crystal projector, etc.), optical fiber communication apparatuses (optical waveguide, optical amplifier, etc.), and imaging apparatuses such as camera and video camera.

The passive optical parts for use in the optically functional apparatuses include for example lens, prism, prism sheet, panel (plate-like molded article), film, optical waveguides (in film-like or fiber-like shapes), optical disk, and encapsulants for LED. If necessary, the passive optical parts may be prepared into a multilayer structure by arranging an appropriate coating layer, for example a protective layer for preventing mechanical damages of the coating face via abrasion or wear, an optically absorption layer for absorbing the light of an undesired wavelength as a cause of deteriorating for example the inorganic fine particles and the substrates, a transmission-shield layer for suppressing or preventing reactive lower molecules such as water and oxygen gas, a glare-shield layer, a reflection-preventing layer, a layer with a small refractive index, and an appropriate additive functional layer. Specific examples of the appropriate coating layer include transparent conductive films and gas barrier films comprising inorganic oxide coating layers, and gas barrier films and hard coat comprising organic coating layers. As the coating method therefor, known coating processes such as vacuum deposition, CVD process, sputtering process, dip-coat process, and spin-coat process may be used.

Optical parts using the organic-inorganic hybrid composition of the invention is preferable for lens substrates in particular. Lens substrates produced by using the organic-inorganic hybrid composition of the invention have great refractive properties, optical transmission properties, and lightweight properties in combination, and have also excellent optical properties. Additionally by appropriately adjusting the type of the monomers composing the organic-inorganic hybrid composition and the amount of the inorganic fine particles to be dispersed, the refractive indices of the lens substrates may appropriately be adjusted.

The term "lens substrate" in accordance with the invention means a single member capable of exerting the lens functions. On the surface of the lens substrate and in the circumference thereof, a film or a member may be arranged, depending on the environment where the lens is used as well as the use thereof. On the surface of the lens substrate, for example, a protective film, a reflection-preventing film, or a hard coat film may be formed. Additionally, the circumference of the lens substrate may be inserted in a frame holding the substrate, for fixing the lens substrate. Herein, these films and frames are members to be added to the lens substrates in accordance with the invention and therefore, the films and frames are discriminated from the lens substrate per se in accordance with the invention.

When the lens substrate in accordance with the invention is utilized as a lens, the lens substrate of the invention per se may be used as a lens, or the lens substrate to which a film or a frame is additionally arranged may be used as a lens. The type or shape of the lens using the lens substrate of the invention is not specifically limited. The lens substrate of the invention is used as for example eyeglass lens, lens for optical apparatuses, lens for opto-electronics, lens for laser, lens for pickups, lens for in-vehicle camera, lens for portable camera, lens for digital camera, lens for OHP, and microlens arrays).

The present application claims priority based on the Japanese Patent Application 2007-86644 (filed on Mar. 29, 2007), the Japanese Patent Application 2007-86645 (filed on Mar. 29, 2007), and the Japanese Patent Application 2007-86646 (filed on Mar. 29, 2007), which are cited herein by reference as parts of the present specification.

EXAMPLES

The characteristic features of the invention are more specifically described in the following Examples. The materials, the amounts of the materials used, the ratios thereof, the contents of the treatment, and the procedures for the treatment may be modified appropriately without departing from the spirit and scope of the invention. Therefore, the scope of the invention should never be understood as limiting to the following specific examples.

[Methods for Analysis and Evaluation]

(1) Observation with Transmission Electron Microscope (TEM)

A transmission electron microscope of type H-9000 UHR as manufactured by Hitachi Co., Ltd. (at an acceleration voltage of 200 kV and a vacuum level of about $7.6 \times 10^{-9}$ Pa under observation) was used.

(2) Measurement of Optical Transmission Ratio

A Sample to be measured was molded into a substrate of a thickness of 1.0 mm. The optical transmission ratio thereof was measured at a wavelength of 589 nm, using an ultraviolet-visible absorption spectrometer UV-3100 (manufactured by Shimadzu Corporation).

(3) Measurement of Refractive Index

Refractive index was measured at a wavelength of 589 nm, using Abbe refractometer (DR-M4 manufactured by Atago Co., Ltd.).

(4) Evaluation of Releasability

After molding under heating and during release from a stainless steel-mold, molded articles spontaneously released are marked with ⊙; molded articles readily released with a slight force are marked with ○; molded articles requiring unreasonable force without any damage but with optical influences due to inner distortion or the deformation of lens surface are marked with Δ; and molded articles requiring large force, so that the molded articles cracked are marked with x.

(5) X-Ray Diffraction (XRD) Spectroscopy

The spectrum was measured at 23° C., using RINT 1500 (X-ray source: copper Kα; a wavelength of 1.5418 angstroms) manufactured by Rigaku Corporation.

(6) Molecular Weight Analysis

The number average molecular weight and the weight average molecular weight are molecular weights measured in a solvent tetrahydrofuran, as detected with a differential refractometer by a GPC analytical apparatus using columns "TSK gel GMHxL", "TSK gel G4000 HxL", "TSK gel G2000 HxL" (all are the trade names of products manufactured by Tosoh Corporation). The molecular weights are on a polystyrene basis.

Production 1 of the Organic-Inorganic Hybrid Composition and the Optical Parts (1) Preparation of a Dispersion of Titanium Oxide Fine Particles in Methylene Chloride To aqueous 0.1 mol/L titanyl sulfate solution under agitation was dropwise added the same volume of aqueous 1.5 mol/L sodium carbonate solution at room temperature over 10 minutes. The resulting white suspension of the ultra-fine particles was centrifuged at 3500 rpm. Procedures for the removal of the resulting supernatant by decantation and washing in water were repeatedly carried out, to purify the product. While dispersing the white precipitate thus obtained in 0.3 mol/L dilute hydrochloric acid under agitation, the precipitate was heated at 50° C. for about one hour, to obtain an acidic hydrosol with transparency. The acidic hydrosol was cooled in ice, to which a solution of diphenyl phosphate in methylene chloride was added, for agitation for 8 hours. The methylene chloride solution was extracted and washed in water, to obtain a solution of titanium oxide fine particles in methylene chloride. A part of the solution was concentrated, to verify the generation of the titanium oxide fine particles of the anatase type (the number average particle size of about 5 nm) by the analysis of the residue by XRD and TEM. Observation by TEM was done with a transmission electron microscope (H-9000 UHR manufactured by Hitachi Co., Ltd.) at an acceleration voltage of 200 kV and a vacuum level of about $7.6 \times 10^{-9}$ Pa under observation (the same conditions were used hereinafter).

(2) Preparation of Zirconium Oxide Fine Particles

A zirconium oxychloride solution at a concentration of 50 g/L was neutralized with an aqueous 48% sodium hydroxide solution, to obtain a suspension of hydrated zirconium. After the suspension was filtered and rinsed in ion exchange water, a hydrated zirconium cake was obtained. The cake was adjusted to a concentration of 15% by weight on a zirconium oxide basis, using ion exchange water as a solvent. The resulting cake was placed in an autoclave, for treatment in water and under heating at a pressure of 150 atm and 150° C. for 24 hours, to prepare a suspension of zirconium oxide fine particles. It was verified by TEM that zirconium oxide fine particles of a number average particle size of 5 nm were generated.

(3) Preparation of a Dispersion of Zirconium Oxide Fine Particles in Methylene Chloride After mixing the aqueous dispersion of the zirconium oxide as synthetically prepared above in (1) with a solution of dibenzyl phosphate (manufactured by Tokyo Chemical Industry Co., Ltd.) in methylene chloride, the resulting mixture was agitated at room temperature for 8 hours. The methylene chloride solution was extracted and washed in water, to obtain a dispersion of zirconium oxide fine particles in methylene chloride.

(4) Preparation of P-5

11.42 g (50 mmol) of bisphenol A and 0.4 g (1 mmol) of benzyl chloride triphenyl phosphonium were added to 100 ml of aqueous 1 mol/L potassium hydroxide solution. The solution was cooled to 0° C., and then under vigorous agitation, a solution of 9.74 g (50 mmol) of phenylphosphonic dichloride dissolved in 20 ml of methylene chloride was dropwise added over 20 minutes. Phenylphosphonic dichloride remaining in the dropping funnel was rinsed with 5 ml of methylene chloride, which was then added. The polymerization temperature is retained at 0° C.±3° C., for agitation for 2 hours. The aqueous phase was decanted and removed, while the organic phase was rinsed in water several times. The organic phase was diluted with 200 ml of methylene chloride, and then poured into methanol under agitation. After the polymer was filtered and recovered, the polymer was dried under reduced pressure at 80° C. The recovery of the polymer was 16.2 g (yield: 92%). The number average molecular weight was 21,300, while the weight average molecular weight was 40,100.

(5) Preparation of P-6

By the same method for the listed compound P-5 except for the use of 17.52 g (50 mmol) of fluorine bisphenol instead of bisphenol A, the listed compound P-6 was obtained. The recovery was 21.3 g (yield: 90%), while the number average molecular weight was 25,200 and the weight average molecular weight was 53,300.

(6) Preparation of P-19

22.73 g (50 mmol) of 9,9-bis[4-(2-hydroxyethoxy)phenyl]fluorine, 150 ml of methylene chloride, and 11.1 g (110 mmol) of triethylamine were mixed together, and the resulting solution was cooled to 0° C. Under vigorous agitation, 12.5 g (50 mmol) of phenylphosphoryl dichloride dissolved in 25 ml of methylene chloride was dropwise added over one hour. After termination of dropwise addition, the resulting mixture was back to room temperature, for reflux for another 4 hours. After the polymer solution was rinsed with 1% dilute hydrochloric acid, the aqueous phase was rinsed with water until neutrality. The organic phase was poured into methanol, from which the polymer was filtered and recovered, for drying under reduced pressure at 80° C. The recovery of the polymer was 25.4 g (yield: 88%), while the number average molecular weight was 28,600 and the weight average molecular weight was 62,900.

(7) Preparation of P-22

Using 7.0 g (20 mmol) of fluorine bisphenol, 16.1 g (60 mmol) of 1,1-bis(4-hydroxyphenyl)cyclohexane, 11.7 g (60 mmol) of phenyl phosphorodichloride and 1.99 g (6.7 mmol) of triphosgene, P-22 was synthetically prepared according to the method described in the Example 1 in the official gazette of JP-A-2004-269844. The recovery of the polymer was 27.8 g (yield: 90%), while the number average molecular weight was 70,200 and the weight average molecular weight was 127,000.

spectrometer (UV-3100 manufactured by Shimadzu Corporation). Further, the refractive index was measured at a wavelength of 589 nm, using Abbe refractometer (DR-M4 manufactured by Atago Co., Ltd.). These results are shown below in Table 3.

Subsequently, the molded article for use as a lens was prepared into a lens shape, to obtain a lens as an optical part.

TABLE 3

| | Resin | Inorganic fine particles | Evaluation of molded article | | |
|---|---|---|---|---|---|
| | | | Dispersibility of inorganic fine particles | Transmission ratio (%) | Refractive index |
| Example 1 | P-5 | Titanium oxide at 40% by mass | Uniformly dispersed in resin | 85 | 1.7 |
| Example 2 | P-5 | Zirconium oxide at 56% by mass | Uniformly dispersed in resin | 83 | 1.7 |
| Example 3 | P-6 | Titanium oxide at 40% by mass | Uniformly dispersed in resin | 83 | 1.73 |
| Example 4 | P-6 | Zirconium oxide at 50% by mass | Uniformly dispersed in resin | 82 | 1.71 |
| Example 5 | P-19 | Titanium oxide at 40% by mass | Uniformly dispersed in resin | 85 | 1.72 |
| Example 6 | P-19 | Zirconium oxide at 56% by mass | Uniformly dispersed in resin | 85 | 1.71 |
| Example 7 | P-22 | Zirconium oxide at 56% by mass | Uniformly dispersed in resin | 72 | 1.71 |
| Comparative Example 1 | P-5 | 0% | Not yet observed | 88 | 1.61 |
| Comparative Example 2 | P-6 | 0% | Not yet observed | 87 | 1.65 |
| Comparative Example 3 | P-19 | 0% | Not yet observed | 89 | 1.63 |
| Comparative Example 4 | P-22 | 0% | Not yet observed | 83 | 1.62 |
| Comparative Example 5 | Comparative Resin A | Zirconium oxide at 50% by mass | Particle aggregation | 0 | Could not measured |
| Comparative Example 6 | Comparative Resin B | Zirconium oxide at 50% by mass | Particle aggregation | 0 | Could not measured |

Comparative resin A: Panlite AD-5503 manufactured by Teijin Chemicals Ltd. (polycarbonate comprising bisphenol A)
Comparative resin B: the polycarbonate resin as a resin No. 2 described in JP-A-2003-73564.

(8) Production of the Organic-Inorganic Hybrid Composition and Optical Parts

The individual lenses of Examples 1 through 7 and Comparative Examples 1 through 6 were produced by the following procedures. The types of the resins, the types of the inorganic fine particles and the amounts thereof shown in Table 3 were used in the following procedures. In Comparative Examples 1 through 4, herein, only the resins were molded with no addition of the inorganic fine particles. In Table 3, further, the amounts of the inorganic fine particles added are expressed on the basis of the mass of the molded article produced.

Titanium oxide fine particles or zirconium oxide fine particles dispersed in methylene chloride were dropwise added to methylene chloride solutions of the resins over 5 minutes. Then, the resulting mixtures were agitated for one hour, from which the solvent was removed to obtain powders of organic-inorganic hybrid compositions. The resulting organic-inorganic hybrid compositions were compression molded under heating at 200° C., to prepare a molded article for use as a lens of a thickness of 1 mm. The molded article was cut, of which the cross section was observed with TEM to determine whether or not the inorganic fine particles were dispersed uniformly in the resins. Additionally, the optical transmission ratio of the molded article for use as a lens of a thickness of 1 mm was measured with an ultraviolet-visible absorption As apparently shown in Table 3, optical parts with a refractive index larger than 1.70 and good transparency could be obtained (Examples 1 through 7). When the resins were singly used without any use of any inorganic fine particles, the resulting optical parts had small refractive indices (Comparative Examples 1 through 4). When the inorganic fine particles were added to polycarbonate, the inorganic fine particles could not be dispersed uniformly therein, so that the resulting mixtures turned opaque, with no recovery of any transparent lens (Comparative Examples 5 and 6).

Production 2 of the Organic-Inorganic Hybrid Composition and the Optical Parts (1) Preparation of a Dispersion of Titanium Oxide Fine Particles To aqueous 0.1 mol/L titanyl sulfate solution under agitation, the same volume of aqueous 1.5 mol/L sodium carbonate solution was dropwise added at room temperature over 10 minutes. The thus obtained white suspension of the ultra-fine particles was centrifuged at 3500 rpm. Procedures for the removal of the resulting supernatant by decantation and washing in water were repeatedly carried out, to purify the product. While dispersing the white precipitate thus obtained in 0.3 mol/L dilute hydrochloric acid under agitation, the precipitate was heated at 50° C. for about one hour, to obtain an acidic hydrosol with transparency. The acidic hydrosol was cooled in ice, to which an aqueous solution of the sodium salt of dodecylbenzene sulfonate was added, so that a white precipitate was generated. Subsequently, the precipitate was extracted in toluene, dried and concentrated. The concentrated residue was analyzed by XRD and TEM, so that the generation of titanium oxide fine particles of the anatase type (the number average particle size was about 5 nm) was verified.

(2) Preparation of Zirconium Oxide Fine Particles

A zirconium oxychloride solution at a concentration of 50 g/L was neutralized with an aqueous 48% sodium hydroxide solution, to obtain a suspension of hydrated zirconium. After the suspension was filtered and rinsed in ion exchange water, a hydrated zirconium cake was obtained. The cake was adjusted to a concentration of 15% by weight on a zirconium oxide basis, using ion exchange water as a solvent. The resulting cake was placed in an autoclave, for treatment in water and under heating at a pressure of 150 atm and 150° C. for 24 hours, to prepare a suspension of zirconium oxide fine particles. It was verified by TEM that zirconium oxide fine particles of a number average particle size of 5 nm were generated.

(3) Preparation of a Dispersion of Zirconium Oxide Fine Particles in Toluene

After mixing the suspension of the zirconium oxide fine particles as synthetically prepared above in (2) with a solution of KAYAMER PM-21 (manufactured by Nippon Kayaku Co., Ltd.) dissolved in toluene, the resulting mixture was agitated at 50° C. for 8 hours. The toluene solution was extracted to obtain a dispersion of zirconium oxide fine particles in toluene.

In case that other dispersants are used, the dispersion can be prepared by the same method.

(4) Preparation of Q-13

0.50 g of 2-carboxyethyl acrylate (M-14) manufactured by Aldrich Co., Ltd. was added to a 300-ml three-necked flask with a reflux condenser and a gas inlet cock. The inside of the flask was substituted with nitrogen twice. Subsequently, 48.5 g of styrene (M-5), 1.0 g of NK ester M-230G (S-7, n=23) manufactured by New Nakamura Chemical Industry Co., Ltd., 21.4 g of ethyl acetate and 0.5 g of V-601 manufactured by Wako Pure Chemicals Co., Ltd. as an initiator were added to the 2-carboxyethyl acrylate. The inside of the flask was substituted twice with nitrogen. Subsequently, the mixture was heated in nitrogen stream at 80° C. for 3 hours. After the temperature was back to room temperature, 30 ml of ethyl acetate was added, for agitation for 10 minutes, which was then charged into 2 L of methanol, for reprecipitation. After the precipitate was filtered and recovered, the precipitate was washed with a large volume of methanol, for drying in vacuum at 60° C. for 3 hours, to obtain Q-13 (yield: 48%; the number average molecular weight: 21,400; the weight average molecular weight: 37,600).

The remaining polymers on the list can also be prepared by the same method.

(5) Preparation of Living Radical Polymerization Initiator A 20 g (75.8 mmol) of α,α'-dibromo-p-xylene and 70 ml of m-xylene were charged in a 200-ml three-necked flask with a reflux condenser and a gas inlet cock, to which a solution of 16.8 g (80.7 mmol) of triisopropyl phosphite dissolved in 20 ml of m-xylene was dropwise added in nitrogen stream under reflux and heating. After the termination of dropwise addition, the resulting mixture was heated under reflux for three hours, to distill off the solvent. The product was purified by silica gel column chromatography, to obtain the initiator A (yield: 53%).

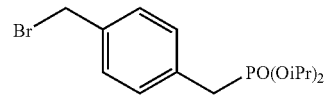

Initiator A (6) Preparation of Q-11

0.41 g of copper bromide, 59.6 g of styrene (M-5), 1.2 g of Blemmer 30 PET-800 manufactured by NOF Corporation (S-23, n=55, n'=9.7), 0.5 g of N,N,N',N',N''-pentamethyldiethylenetriamine and 1.0 g of the initiator A were charged in a 200-ml three-necked flask with a reflux condenser and a gas inlet cock. The inside of the flask was substituted with nitrogen five times. Subsequently, the mixture was heated in nitrogen stream at 80° C. for 5 hours. After the temperature was back to room temperature, 30 g of alumina and 50 ml of toluene were added, for agitation for 10 minutes. Then, the mixture was filtered through Celite. The filtrate was charged in a large volume of methanol, for precipitation. The precipitate was filtered and recovered, washed with a large volume of methanol, for drying in vacuum at 60° C. for 3 hours, to obtain a polymer (yield: 38%).

10 g of the polymer thus obtained, 2.3 g of trimethylsilyl bromide and 40 ml of methylene chloride were charged in a 100-ml three-necked flask with a gas inlet cock. The resulting mixture was agitated in nitrogen stream at room temperature for 24 hours. After 10 ml of water was added for agitation for one hour, the resulting mixture was charged in a large volume of methanol, for precipitation. The resulting precipitate was filtered and recovered, washed in a large volume of methanol, and dried in vacuum at 60° C. for 3 hours, to obtain Q-11 (yield: 96%; the number average molecular weight: 32,900; the weight average molecular weight: 38,200).

The remaining polymers on the list can also be prepared by the same method.

(7) Preparation of QQ-3

Without the use of the monomer component S-5 among the monomer components for Q-3, the remaining monomers were used at the same ratio as described above, to obtain QQ-3 according to the method described above in (6).

(8) Preparation of QQ-14

Without the use of the monomer component S-26 among the monomer components for Q-14, the remaining monomers were used at the same ratio as described above, to obtain QQ-14 according to the method described above in (6).

(9) Production of the Organic-Inorganic Hybrid Composition and Optical Parts

The individual lenses of Examples 11 through 20 and Comparative Examples 11 through 15 were produced by the following procedures. The types of the resins, the types of the inorganic fine particles and the amounts thereof shown in Table 4 were used in the following procedures, where the refractive indices of the resins and the inorganic fine particles are also shown. In Comparative Examples 13 and 14, herein, only the resins were molded with no addition of the inorganic fine particles. In Table 4, further, the amounts of the inorganic fine particles added are expressed on the basis of the mass of the molded article produced.

Titanium oxide fine particles or zirconium oxide fine particles dispersed in toluene were dropwise added to toluene solutions of the resins over 5 minutes. Then, the resulting mixtures were agitated for one hour, from which the solvent was removed to obtain powders of organic-inorganic hybrid compositions. The resulting organic-inorganic hybrid compositions were compression molded under heating at 220° C., to prepare a molded article for use as a lens of a thickness of 1 mm. Then, the releasability from the mold was evaluated. The molded article was cut, of which the cross section was observed with TEM to determine whether or not the inorganic fine particles were dispersed uniformly in the resins. Additionally, the optical transmission ratio of the molded article for use as a lens of a thickness of 1 mm was measured with an ultraviolet-visible absorption spectrometer (UV-3100 manufactured by Shimadzu Corporation). Further, the refractive index was measured at a wavelength of 589 nm, using Abbe refractometer (DR-M4 manufactured by Atago Co., Ltd.). These results are shown below in Table 4.

Subsequently, the molded article for use as a lens was prepared into a lens shape, to obtain a lens as an optical part.

Production 3 of the Organic-Inorganic Hybrid Composition and the Optical Parts (1) Preparation of Titanium Oxide Fine Particles According to the method described in the Synthetic Example 9 in the official gazette of JP-A-2003-73559, titanium oxide fine particles were prepared synthetically. The generation of titanium oxide fine particles of the anatase type (the number average particle size was about 5 nm) was verified by XRD and TEM.

TABLE 4

| | Resin | | Inorganic fine particles | | | Evaluation of molded article | | | |
|---|---|---|---|---|---|---|---|---|---|
| | | | | | | | Dispersibility | Optical | |
| | Type | Refractive index | Type | Refractive index | Amount added (% by mass) | Releasability | of inorganic fine particles | transmission ratio (%) | Refractive index |
| Example 11 | Q-3 | 1.491 | Titanium oxide | 2.4 | 55 | ◎ | Uniform dispersion | 88 | 1.647 |
| Example 12 | Q-11 | 1.591 | Zirconium oxide | 2.1 | 46 | ◎ | Uniform dispersion | 85 | 1.661 |
| Example 13 | Q-13 | 1.588 | Zirconium oxide | 2.1 | 56 | ◎ | Uniform dispersion | 87 | 1.682 |
| Example 14 | Q-14 | 1.590 | Zirconium oxide | 2.1 | 48 | ◎ | Uniform dispersion | 86 | 1.665 |
| Example 15 | Q-17 | 1.586 | Titanium oxide | 2.4 | 26 | ○ | Uniform dispersion | 80 | 1.657 |
| Example 16 | Q-18 | 1.588 | Titanium oxide | 2.4 | 35 | ○ | Uniform dispersion | 81 | 1.694 |
| Example 17 | Q-23 | 1.597 | Zirconium oxide | 2.1 | 42 | ◎ | Uniform dispersion | 85 | 1.654 |
| Example 18 | Q-28 | 1.671 | Zirconium oxide | 2.1 | 42 | ○ | Uniform dispersion | 81 | 1.721 |
| Example 19 | Q-30 | 1.644 | Titanium oxide | 2.4 | 26 | ◎ | Uniform dispersion | 85 | 1.727 |
| Example 20 | Q-31 | 1.574 | Zirconium oxide | 2.1 | 56 | ◎ | Uniform dispersion | 84 | 1.671 |
| Comparative Example 11 | QQ-3 | 1.493 | Titanium oxide | 2.4 | 55 | X | Uniform dispersion | 82 | 1.643 |
| Comparative Example 12 | QQ-14 | 1.592 | Zirconium oxide | 2.1 | 48 | X | Uniform dispersion | 81 | 1.659 |
| Comparative Example 13 | Q-3 | 1.491 | — | — | 0 | Δ | — | 88 | 1.492 |
| Comparative Example 14 | Q-14 | 1.590 | — | — | 0 | Δ | — | 87 | 1.590 |
| Comparative Example 15 | Polystyrene | 1.590 | Zirconium oxide | 2.1 | 56 | X | Aggregation | Could not be measured | Could not be measured |

(Note)
The polystyrene used in Comparative Example 15 (manufactured by Aldrich Co., Ltd.) was with Product No. 18,242-7 (the molecular weight: 280,000)

As apparently shown in Table 4, optical parts with a refractive index larger than 1.65 and good transparency could be obtained (Examples 11 through 19). Because the releasability after molding was poor in Comparative Examples 11 and 12, the surfaces of the resulting lenses were partially damaged. Because no inorganic fine particles were added in Comparative Examples 13 and 14, optical parts with sufficiently large refractive indices could not be obtained. In Comparative Example 15, the inorganic fine particles could not be dispersed uniformly, so that the fine particles aggregated, leading to small optical transmission ratios. Thus, the refractive indices thereof could not be measured with Abbe refractometer.

(2) Preparation of Zirconium Oxide Fine Particles

A zirconium oxychloride solution at a concentration of 50 g/L was neutralized with an aqueous 48% sodium hydroxide solution, to obtain a suspension of hydrated zirconium. After the suspension was filtered and rinsed in ion exchange water, a hydrated zirconium cake was obtained. The cake was adjusted to a concentration of 15% by mass on a zirconium oxide basis, using ion exchange water as a solvent. The resulting cake was placed in an autoclave, for treatment in water and under heating at a pressure of 150 atm and 150° C. for 24 hours, to prepare a suspension of zirconium oxide fine particles. It was verified by TEM that zirconium oxide fine particles of a number average particle size of 5 nm was generated.

(3) Preparation of a Dispersion (1) of Zirconium Oxide Fine Particles in Toluene After mixing the suspension of the zirconium oxide as synthetically prepared above in (2) with a solution of KAYAMER PM-21 (manufactured by Nippon Kayaku Co., Ltd.) dissolved in toluene, the resulting mixture was agitated at 50° C. for 8 hours. The toluene solution was extracted and washed in water, to obtain a dispersion of the zirconium oxide fine particles in toluene.

(4) Preparation of a Dispersion (2) of Zirconium Oxide in Dimethylacetamide 500 g of N,N'-dimethylacetamide was added to 500 g of the dispersion of zirconium oxide (aqueous dispersion at 15% by mass) as prepared above in (1), for concentration under reduced pressure until the mixture was around 500 g or less, for solvent substitution. Then, the concentration was adjusted by adding N,N'-dimethylacetamide, to obtain the dispersion (2) of zirconium oxide in dimethylacetamide at 15% by mass.

(5) Preparation of Thiol Derivative A 39.2 g (50 mmol) of dipentaerythritol hexa(3-mercaptopropionate), 32.5 g (250 mmol) of itaconic acid and 127.3 g of 1-methoxy-2-propanol were charged in a 300-ml three-necked flask with a reflux condenser and a gas inlet cock, for heating in nitrogen stream to 90° C. 288 mg of dimethyl 2,2-azobisisobutylate dissolved in 20 g of 1-methoxy-2-propanol was added. After reaction at 90° C. for 2 hours, 288 mg of dimethyl 2,2-azobisisobutylate dissolved in 20 g of 1-methoxy-2-propanol was additionally added. After reaction at 90° C. for 2 hours, the temperature was raised to 100° C., for reaction for another one hour, to obtain a solution of thiol derivative A at 30% by mass. The reaction solution was analyzed by $^1$H NMR. 1/m=5/1 was verified.

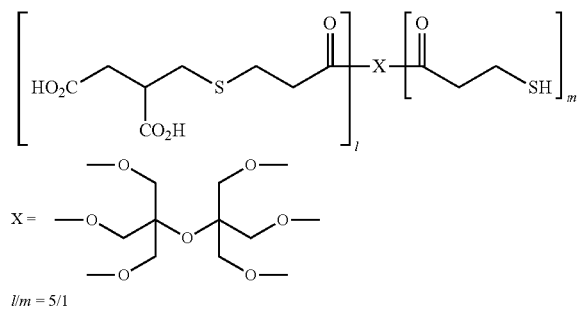

Thiol Derivative A

(6) Preparation of J-1

4.78 g (1 mmol) of a solution of the thiol derivative A in 1-methoxy-2-propanol at 30% by mass, 44.9 g (0.20 mol) of 2-phenylphenoxyacrylate and 20 ml of THF were charged in a 300-ml three-necked flask with a reflux condenser and a gas inlet cock, for heating in nitrogen stream to 80° C. 92 mg of dimethyl 2,2-azobisisobutylate dissolved in 1 ml of THF was added. After reaction at 80° C. for 2 hours, 46 mg of dimethyl 2,2-azobisisobutylate dissolved in 20 ml of THF was added. After reaction at 80° C. for 2 hours, the resulting reaction mixture was appropriately diluted with ethyl acetate, and charged in a large volume of methanol, for precipitation. After the precipitate was filtered and recovered, the precipitate was washed in a large volume of methanol, and dried in vacuum at 50° C. for 12 hours, to obtain a listed compound J-1 (yield: 84%). The number average molecular weight was 36,800, while the weight average molecular weight was 59,000.

(7) Preparation of J-5

4.78 g (1 mmol) of a solution of the thiol derivative A in 1-methoxy-2-propanol at 30% by mass, 35.2 g (0.20 mol) of benzyl methacrylate and 14.1 ml of THF were charged in a 300-ml three-necked flask with a reflux condenser and a gas inlet cock, for heating in nitrogen stream to 80° C. 92 mg of dimethyl 2,2-azobisisobutylate dissolved in 1 ml of THF was added. After reaction at 80° C. for 2 hours, 46 mg of dimethyl 2,2-azobisisobutylate dissolved in 20 ml of THF was added. After reaction at 80° C. for 2 hours, the resulting reaction mixture was appropriately diluted with ethyl acetate, and charged in a large volume of methanol, for precipitation. After the precipitate was filtered and recovered, the precipitate was washed in a large volume of methanol, and dried in vacuum at 50° C. for 12 hours, to obtain a listed compound J-5 (yield: 81%). The number average molecular weight was 29,100, while the weight average molecular weight was 49,200.

(8) Preparation of PMMA (Polymethyl Methacrylate)

5.00 g of methyl methacrylate and 0.25 g of azobisisobutyronitrile were added to 2-butanone, for polymerization in nitrogen at 70° C., to synthetically prepare PMMA. The weight average molecular weight was 100,000.

(9) Production of the Organic-Inorganic Hybrid Composition and Optical Parts

(9-1) Examples 21 through 24 and Comparative Examples 21 through 24

The individual lenses of Examples 21 through 24 and Comparative Examples 21 through 24 were produced by the following procedures. The types of the resins, the types of the inorganic fine particles and the amounts thereof shown in Table 5 were used in the following procedures, where the refractive indices of the resins and the inorganic fine particles are also shown. In Comparative Examples 21 and 22, herein, only the resins were molded with no addition of the inorganic fine particles. In Table 5, further, the amounts of the inorganic fine particles added are expressed on the basis of the mass of the molded article produced.

Titanium oxide fine particles or zirconium oxide fine particles dispersed in toluene were dropwise added to anisole solutions of the resins over 5 minutes. Then, the resulting mixtures were agitated for one hour, from which the solvent was removed to obtain powders of organic-inorganic hybrid compositions. The resulting organic-inorganic hybrid compositions were compression molded under heating at a pressure of 13.7 MPa and a temperature of 180° C. for 2 minutes, to prepare a molded article for use as a lens of a thickness of 1 mm. The molded article was cut, of which the cross section was observed with TEM to determine whether or not the inorganic fine particles were dispersed uniformly in the resins. Additionally, the optical transmission ratio of the molded article for use as a lens of a thickness of 1 mm was measured with an ultraviolet-visible absorption spectrometer (UV-3100 manufactured by Shimadzu Corporation). Further, the refractive index was measured at a wavelength of 589 nm, using Abbe refractometer (DR-M4 manufactured by Atago Co., Ltd.). These results are shown below in Table 5.

Subsequently, the molded article for use as a lens was prepared into a lens shape, to obtain a lens as an optical part.

(9-2) Example 25

A thermoplastic resin J-1, n-octylbenzoic acid and a plasticizer KP-L155 (under the trade name; manufactured by KAO Corporation) were added to the dimethylacetamide dispersion of the zirconium oxide to a ratio of the $ZrO_2$ solid content/J-1/n-octylbenzoic acid/KP-L155=35.7/42.9/7.1/14.3, for uniform mixing under agitation. Subsequently, the dimethylacetamide solvent was concentrated under reduced pressure and heating. The concentrated residue was compression molded under heating under the same conditions as in Example 21, to prepare a transparent molded article (lens substrate). The molded article obtained in Example 25 was cut, of which the cross section was observed with TEM. Additionally, the optical transmission ratio and refractive index thereof were measured. The results are shown below in Table 5.

(9-3) Example 26

Except for the change of the thermoplastic resin J-1 to J-5, the transparent molded articles (lens substrates) of Example 26 were prepared in the same manner as in Example 25. The molded articles obtained in Example 26 were individually cut, of which the cross sections were observed with TEM. Additionally, the optical transmission ratios and refractive indices thereof were measured. The results are shown below in Table 5.

(4) Example 27

By charging the dimethylacetamide solution of the organic-inorganic hybrid composition described in Example 25 before concentration into a large excess of water, filtering and recovering the resulting precipitate and then drying the precipitate, the organic-inorganic hybrid composition of Example 27 was recovered. In the same manner as in Example 21, the organic-inorganic hybrid composition was treated to obtain a transparent molded article (lens substrate) of Example 27. The molded article obtained in Example 27 was cut, of which the cross section was observed with TEM. Additionally, the optical transmission ratio and refractive index thereof were measured. The results are shown below in Table 5.

TABLE 5

| | Resin | | Inorganic fine particles | | | Evaluation of molded article | | |
|---|---|---|---|---|---|---|---|---|
| | Type | Refractive index | Type | Refractive index | Amount added (% by mass) | Dispersibility of inorganic fine particles | Optical transmission ratio (%) | Refractive index |
| Example 21 | J-1 | 1.62 | Titanium oxide | 2.5 | 48 | Uniform dispersion in resin | 80 | 1.75 |
| Example 22 | J-1 | 1.62 | Zirconium oxide | 2.1 | 56 | Uniform dispersion in resin | 81 | 1.69 |
| Example 23 | J-5 | 1.57 | Titanium oxide | 2.5 | 48 | Uniform dispersion in resin | 81 | 1.71 |
| Example 24 | J-5 | 1.57 | Zirconium oxide | 2.1 | 56 | Uniform dispersion in resin | 82 | 1.66 |
| Example 25 | J-1 | 1.62 | Zirconium oxide | 2.1 | 35.7 | Uniform dispersion in resin | 84 | 1.64 |
| Example 26 | J-5 | 1.57 | Zirconium oxide | 2.1 | 35.7 | Uniform dispersion in resin | 85 | 1.61 |
| Example 27 | J-1 | 1.62 | Zirconium oxide | 2.1 | 35.7 | Uniform dispersion in resin | 83 | 1.64 |
| Comparative Example 21 | J-1 | 1.62 | — | — | 0 | — | 86 | 1.62 |
| Comparative Example 22 | J-5 | 1.57 | — | — | 0 | — | 88 | 1.57 |
| Comparative Example 23 | Polystyrene | 1.59 | Zirconium oxide | 2.1 | 56 | Particle aggregation (opaque) | — | — |
| Comparative Example 24 | PMMA | 1.49 | Titanium oxide | 2.5 | 48 | Particle aggregation (opaque) | — | — |

(Note)
The polystyrene was with "Product No. 18,242-7 (Mw: 280,000) manufactured by Aldrich Co., Ltd.

As apparently shown in Table 5, the transparent molded articles containing the fine particles in accordance with the invention have large refractive indices, and the molded articles as thick as 1 mm have such great transparency that the molded articles can be used preferably for optical applications.

Additionally, it was verified that the organic-inorganic hybrid compositions mainly comprising thermoplastic resins, in accordance with the invention, could form lens shapes accurately in a manner coinciding with the mold shapes, at high productivity.

INDUSTRIAL APPLICABILITY

The optical parts of the invention contain an organic-inorganic hybrid composition with a combination of great refraction properties, optical transmission properties and lightweight properties. In accordance with the invention, optical parts with a refractive index appropriately adjusted can be provided in a relatively ready fashion. Additionally, optical parts with great mechanical strength and excellent thermal resistance can readily be provided. Therefore, the invention is useful for providing a wide variety of optical parts such as highly refractive lenses. Thus, the invention has great industrial applicability.

The invention claimed is:

1. An organic-inorganic hybrid composition comprising a thermoplastic resin and inorganic fine particles, wherein the thermoplastic resin is a resin represented by the following formula (21):

$$[A^6\text{—}S\text{—}L^6\text{—}]_{m6}X^6\text{—}[\text{—}L^7\text{—}S\text{—}Poly\text{—}]_{n6}H$$

wherein $L^6$ and $L^7$ independently represent a single bond or a divalent linker group; $X^6$ represents a linker group of a valence of (m6+n6); Poly represents a polymer of vinyl monomers; m6 and n6 independently represent an integer of 1 to 10; and $A^6$ represents a substituent selected from the group consisting of:

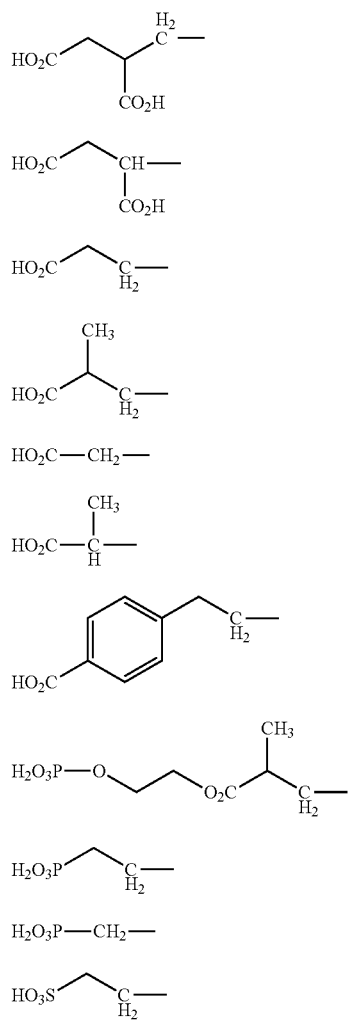

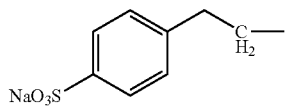

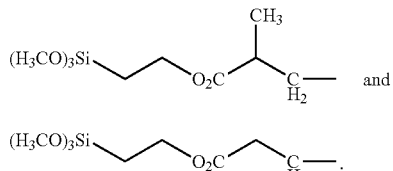

2. The organic-inorganic hybrid composition according to claim 1, comprising a thermoplastic resin represented by the formula (21) and inorganic fine particles.

3. The organic-inorganic hybrid composition according to claim 1, wherein the number average particle size of the inorganic fine particles is 1 to 15 nm.

4. The organic-inorganic hybrid composition according to claim 1, wherein the refractive index of the inorganic fine particles at a wavelength of 589 nm is 1.90 to 3.00.

5. The organic-inorganic hybrid composition according to claim 1, wherein the inorganic fine particles are at least one type selected from the group consisting of zirconium oxide, zinc oxide, tin oxide and titanium oxide.

6. The organic-inorganic hybrid composition according to claim 1, wherein the optical transmission ratio of the organic-inorganic hybrid composition at a wavelength of 589 nm on a 1-mm thickness basis is 70% or more.

7. The organic-inorganic hybrid composition according to claim 1, wherein the organic-inorganic hybrid composition is thermoplastic.

8. The organic-inorganic hybrid composition according to claim 1, wherein the relation in size between m6 and n6 in the formula (21) is m6≥n6.

9. The organic-inorganic hybrid composition according to claim 1, wherein $X^6$ in the formula (21) represents a linker group selected from the group consisting of:

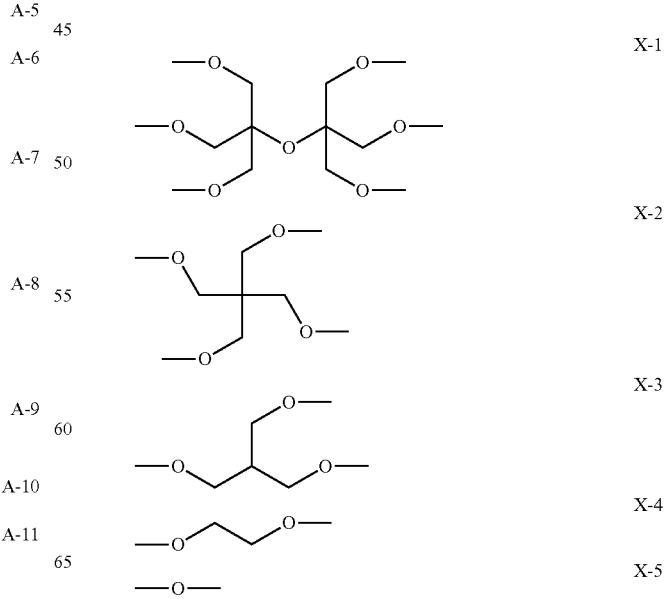

-continued

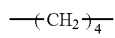
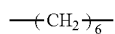
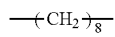
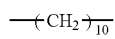
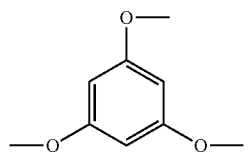
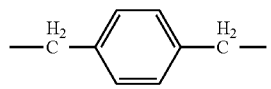
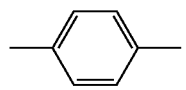
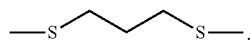

10. The organic-inorganic hybrid composition according to claim 1, wherein $L^6$ and $L^7$ in the formula (21) independently represent a single bond or a divalent linker group selected from the group consisting of:

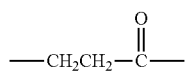
L-1

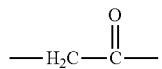
L-2

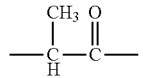
L-3

L-4

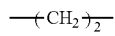
L-5

L-6

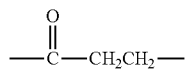
L-7

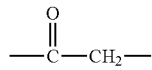
L-8

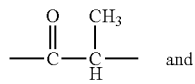
L-9

-continued

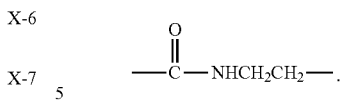
L-10

11. The organic-inorganic hybrid composition according to claim 1, wherein Poly in the formula (21) represents a polymer consisting of a repeating unit selected from the group consisting of:

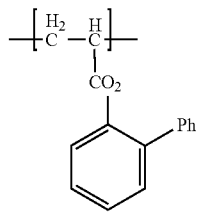
R-1

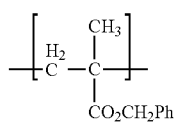
R-2

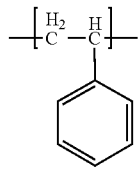
R-3

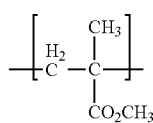
R-4

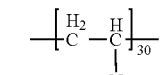
R-5

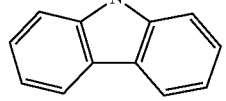

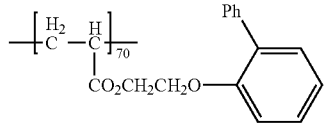
and

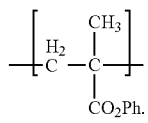
R-6

12. A molded article comprising an organic-inorganic hybrid composition, wherein:
   the maximum thickness of the molded article is 0.1 mm or more, and
   the organic-inorganic hybrid composition comprises a thermoplastic resin and inorganic fine particles, wherein the thermoplastic resin is a resin represented by the following formula (21):

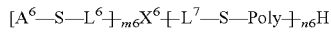

wherein $L^6$ and $L^7$ independently represent a single bond or a divalent linker group; $X^6$ represents a linker group of a valence of (m6+n6); Poly represents a polymer of vinyl monomers; m6 and n6 independently represent an integer of 1 to 10; and $A^6$ represents a substituent selected from the group consisting of:

A-1: $HO_2C-CH_2-CH(CO_2H)-$

A-2: $HO_2C-CH(CO_2H)-$

A-3: $HO_2C-CH_2-$

A-4: $HO_2C-C(CH_3)H-CH_2-$

A-5: $HO_2C-CH_2-$

A-6: $HO_2C-CH(CH_3)-$

A-7: $HO_2C-C_6H_4-CH_2-$

A-8: $H_2O_3P-O-CH_2CH_2-O_2C-CH(CH_3)-CH_2-$

A-9: $H_2O_3P-CH_2-$

A-10: $H_2O_3P-CH_2-$

A-11: $HO_3S-CH_2-$

A-12: $NaO_3S-C_6H_4-CH_2-$

A-13: $(H_3CO)_3Si-CH_2CH_2CH_2-O_2C-CH(CH_3)-CH_2-$ and

A-14: $(H_3CO)_3Si-CH_2CH_2CH_2-O_2C-CH_2-$.

13. The molded article according to claim 12, wherein the optical transmission ratio at a wavelength of 589 nm on a 1-mm thickness basis is 70% or more and the refractive index is 1.63 or more.

14. An optical part comprising a molded article comprising an organic-inorganic hybrid composition wherein:

the maximum thickness of the molded article is 0.1 mm or more, the optical transmission ratio of the molded article at a wavelength of 589 nm on a 1-mm thickness basis is 70% or more and the refractive index of the molded article is 1.63 or more, and the organic-inorganic hybrid composition comprises a thermoplastic resin and inorganic fine particles, wherein the thermoplastic resin is a resin represented by the following formula (21):

$$[A^6-S-L^6\,]_{m6}X^6\,[\,L^7-S-Poly\,]_{n6}H$$

wherein $L^6$ and $L^7$ independently represent a single bond or a divalent linker group; $X^6$ represents a linker group of a valence of (m6+n6); Poly represents a polymer of vinyl monomers; m6 and n6 independently represent an integer of 1 to 10; and $A^6$ represents a substituent selected from the group consisting of:

A-1: $HO_2C-CH_2-CH(CO_2H)-$

A-2: $HO_2C-CH(CO_2H)-$

A-3: $HO_2C-CH_2-$

A-4: $HO_2C-C(CH_3)H-CH_2-$

A-5: $HO_2C-CH_2-$

A-6: $HO_2C-CH(CH_3)-$

A-7: $HO_2C-C_6H_4-CH_2-$

A-8: $H_2O_3P-O-CH_2CH_2-O_2C-CH(CH_3)-CH_2-$

A-9: $H_2O_3P-CH_2-$

A-10: $H_2O_3P-CH_2-$

A-11: $HO_3S-CH_2-$

A-12: $NaO_3S-C_6H_4-CH_2-$

-continued
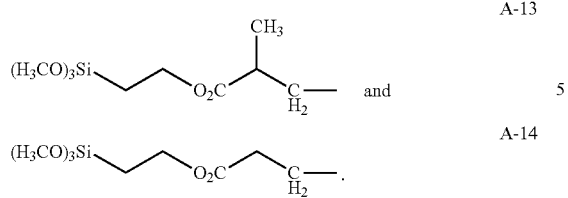
A-13
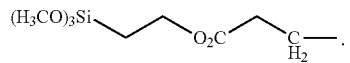
A-14
15. The optical part according to claim 14, wherein the optical part is a lens substrate.
* * * * *